(12) United States Patent
Ghosh et al.

(10) Patent No.: US 10,628,838 B2
(45) Date of Patent: Apr. 21, 2020

(54) SYSTEM AND METHOD FOR MODELING AND FORECASTING CYCLICAL DEMAND SYSTEMS WITH DYNAMIC CONTROLS AND DYNAMIC INCENTIVES

(71) Applicant: International Business Machines Corporation, Armonk, NY (US)

(72) Inventors: Soumyadip Ghosh, Peekskill, NY (US); Jonathan R. M. Hosking, Scarsdale, NY (US); Ramesh Natarajan, Pleasantville, NY (US); Shivaram Subramanian, Danbury, CT (US); Xiaoxuan Zhang, Park Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 13/869,628

(22) Filed: Apr. 24, 2013

(65) Prior Publication Data

US 2014/0324532 A1 Oct. 30, 2014

(51) Int. Cl.
*G06Q 30/02* (2012.01)

(52) U.S. Cl.
CPC ..... *G06Q 30/0202* (2013.01); *G06Q 30/0206* (2013.01)

(58) Field of Classification Search
CPC .................................................. G06Q 30/0202
See application file for complete search history.

(56) References Cited

U.S. PATENT DOCUMENTS

| | | | |
|---|---|---|---|
| 7,251,589 B1 * | 7/2007 | Crowe | G06F 17/18 702/181 |
| 2002/0165816 A1 | 11/2002 | Barz | |
| 2003/0139905 A1 | 7/2003 | Helsper et al. | |
| 2005/0222784 A1 | 10/2005 | Tuff et al. | |

(Continued)

FOREIGN PATENT DOCUMENTS

| | | |
|---|---|---|
| CN | 101227251 A | 7/2008 |
| IN | 201101621 | 7/2011 |

(Continued)

OTHER PUBLICATIONS

Taylor et al, A comparison of univariate methods for forecasting electricity demand up to a day ahead, International Journal of Forecasting vol. 22, Issue 1, Jan.-Mar. 2006, pp. 1-16.*

(Continued)

*Primary Examiner* — Andre D Boyce
(74) *Attorney, Agent, or Firm* — Daniel P. Morris; Ryan, Mason & Lewis, LLP

(57) ABSTRACT

Systems and methods for modeling and forecasting cyclical demand systems in the presence of dynamic control or dynamic incentives. A method for modeling a cyclical demand system comprises obtaining historical data on one or more demand measurements over a plurality of demand cycles, obtaining historical data on incentive signals over the plurality of demand cycles, constructing a model using the obtained historical data on the one or more demand measurements and the incentive signals, wherein constructing the model comprises specifying a state-space model, specifying variance parameters in the model, and estimating unknown variance parameters.

20 Claims, 23 Drawing Sheets

(56) References Cited

U.S. PATENT DOCUMENTS

| | | | | |
|---|---|---|---|---|
| 2009/0210081 A1* | 8/2009 | Sustaeta | ............ | G05B 13/0285 700/99 |
| 2010/0257133 A1* | 10/2010 | Crowe | ................... | G06Q 10/10 706/58 |
| 2011/0231028 A1* | 9/2011 | Ozog | ..................... | G06Q 10/06 700/291 |
| 2014/0058572 A1* | 2/2014 | Stein | ...................... | G06Q 50/06 700/291 |

FOREIGN PATENT DOCUMENTS

| | | |
|---|---|---|
| RU | 2325683 C2 | 5/2008 |
| WO | 03054704 A1 | 7/2003 |

OTHER PUBLICATIONS

George W. Pasdirtz, "World Late Twentieth Century (WL20) Model Extended to 2008," University of Wisconsin—Madison, Mar. 2010, 48 pages.

U.S. Department of Energy, "The Smart Grid," http://www.smartgrid.gov/the_smart_grid#smart_grid, accessed Aug. 2012, 2 pages.

D.J. Hammerstrom et al., "Pacific Northwest GridWise Testbed Demonstration Projects—Part I. Olympic Peninsula Project," Pacific Northwest National Laboratory, PNNL-17167, Oct. 2007, 157 pages.

U.S. Department of Energy, "Pacific Northwest Smart Grid Demonstration Project," Batelle Memorial Institute, http://www.smartgrid.gov/project/battelle_memorial_institute_pacific_northwest_division_smart_grid_demonstration_project, accessed Aug. 2012, 1 page.

P.P. Varaiya et al., "Smart Operation of Smart Grid: Risk-Limiting Dispatch," Proceedings of the IEEE, Jan. 2011, pp. 40-57, vol. 99, No. 1.

P. Denholm et al., "The Role of Energy Storage with Renewable Electricity Generation," National Renewable Energy Laboratory, Technical Report NREL/TP-6A2-47187, Jan. 2010, 61 pages.

Hunt Allcott, "Rethinking Real-Time Electricity Pricing," Resource and Energy Economics, Jan. 2011, pp. 820-842, vol. 33, No. 1.

H.K. Alfares et al., "Electric Load Forecasting: Literature Survey and Classification of Methods," International Journal of Systems Science, Jan. 2002, pp. 23-34, vol. 33, No. 1.

E.A. Feinberg et al., "Load Forecasting," Applied Mathematics for Restructured Electric Power Systems: Optimization, Control and Computational Intelligence, Chapter 12, 2005, pp. 269-285.

J.W. Taylor et al., "A Comparison of Univariate Methods for Forecasting Electricity Demand Up to a Day Ahead," International Journal of Forecasting, Dec. 2005, pp. 1-16, vol. 22, No. 1.

R. Ramanathan et al., "Short-Run Forecasts of Electricity Loads and Peaks," International Journal of Forecasting, Jun. 1997, pp. 161-174, vol. 13, No. 2.

S. Fan et al., "Short-Term Load Forecasting Based on a Semi-Parametric Additive Model," IEEE Transactions on Power Systems, Feb. 2012, pp. 134-141, vol. 27, No. 1.

V. Dordonnat et al., "An Hourly Periodic State Space Model for Modelling French National Electricity Load," International Journal of Forecasting, Jan. 2008, pp. 566-587, vol. 24.

M. Smith et al., "Parsimonious Covariance Matrix Estimation for Longitudinal Data," Journal of the American Statistical Association, Theory and Methods, Dec. 2002, pp. 1141-1153, vol. 97, No. 460.

R. Cottet et al., "Bayesian Modeling and Forecasting of Intraday Electricity Load," Journal of the American Statistical Association, Applications and Case Studies, Dec. 2003, pp. 839-849, vol. 98, No. 464.

V. Dordonnat et al., "Dynamic Factors in State-Space Models for Hourly Electricity Load Signal Decomposition and Forecasting," IEEE Power & Energy Society General Meeting, Jul. 2009, pp. 1-8.

V. Dordonnat et al., "Dynamic Factors in Periodic Time-Varying Regressions with an Application to Hourly Electricity Load Modelling," Computational Statistics and Data Analysis, Nov. 2012, pp. 3134-3152, vol. 56, No. 11.

A. Harvey et al., "Forecasting Hourly Electricity Demand Using Time-Varying Splines," Journal of the American Statistical Association, Applications and Case Studies, Dec. 1993, pp. 1228-1236, vol. 88, No. 424.

V. Dordonnat et al., "Intra-Daily Smoothing Splines for Time-Varying Regression Models of Hourly Electricity Load," The Journal of Energy Markets, Mar. 2010, pp. 17-52, vol. 3, No. 1.

W. Hendricks et al., "Stochastic Parameter Models for Panel Data: An Application to the Connecticut Peak Load Pricing Experiment," International Economic Review, Oct. 1979, pp. 707-724, vol. 20, No. 3.

J. Durbin et al., "Time Series Analysis by State Space Methods," Oxford Statistical Science Series, 2nd ed., May 2012, pp. 82-85 and 112-113, Oxford University Press.

P.J. Harrison et al., "Bayesian Forecasting," Journal of the Royal Statistical Society, Series B (Methodological), May 1976, pp. 205-247, vol. 38, No. 3.

G. Petris et al., "Dynamic Linear Models with R," Springer, Aug. 2007, 186 pages.

A.C. Harvey et al., "Structural Time Series Models," Handbook of Statistics, 1993, pp. 261-302, vol. 11.

J.J.F. Commandeur et al., "Statistical Software for State Space Methods," Journal of Statistical Software, May 2011, pp. 1-18, vol. 41, No. 1.

R. Development Core Team, "R: A Language and Environment for Statistical Computing," R. Foundation for Statistical Computing, http://www.R-project.org/, 2011, 3 pages, Vienna, Austria.

Jouni Helske, "KFAS: Kalman Filter and Smoother for Exponential Family State Space Models," R Package Version 0.9.11, http://CRAN.R-project.org/package=KFAS, Jul. 2012, 1 page.

\* cited by examiner

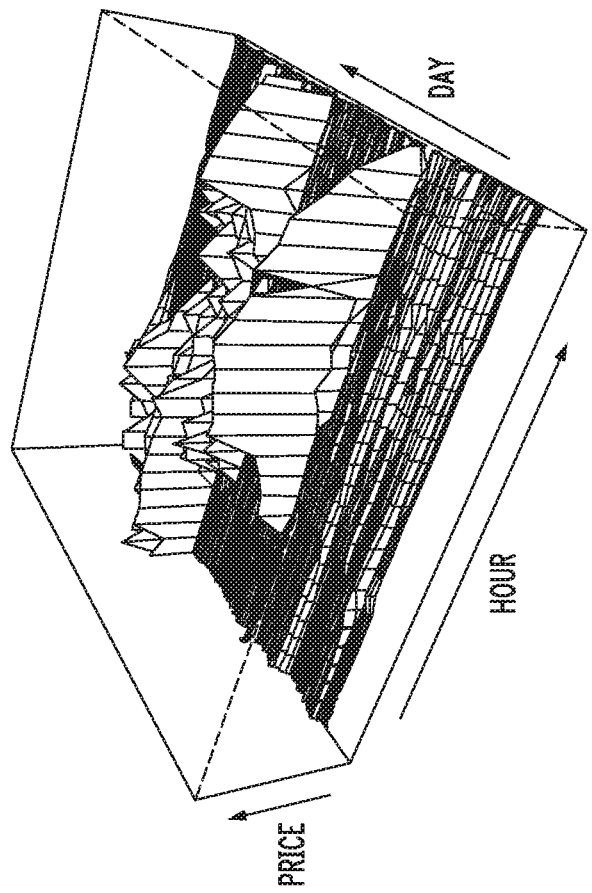

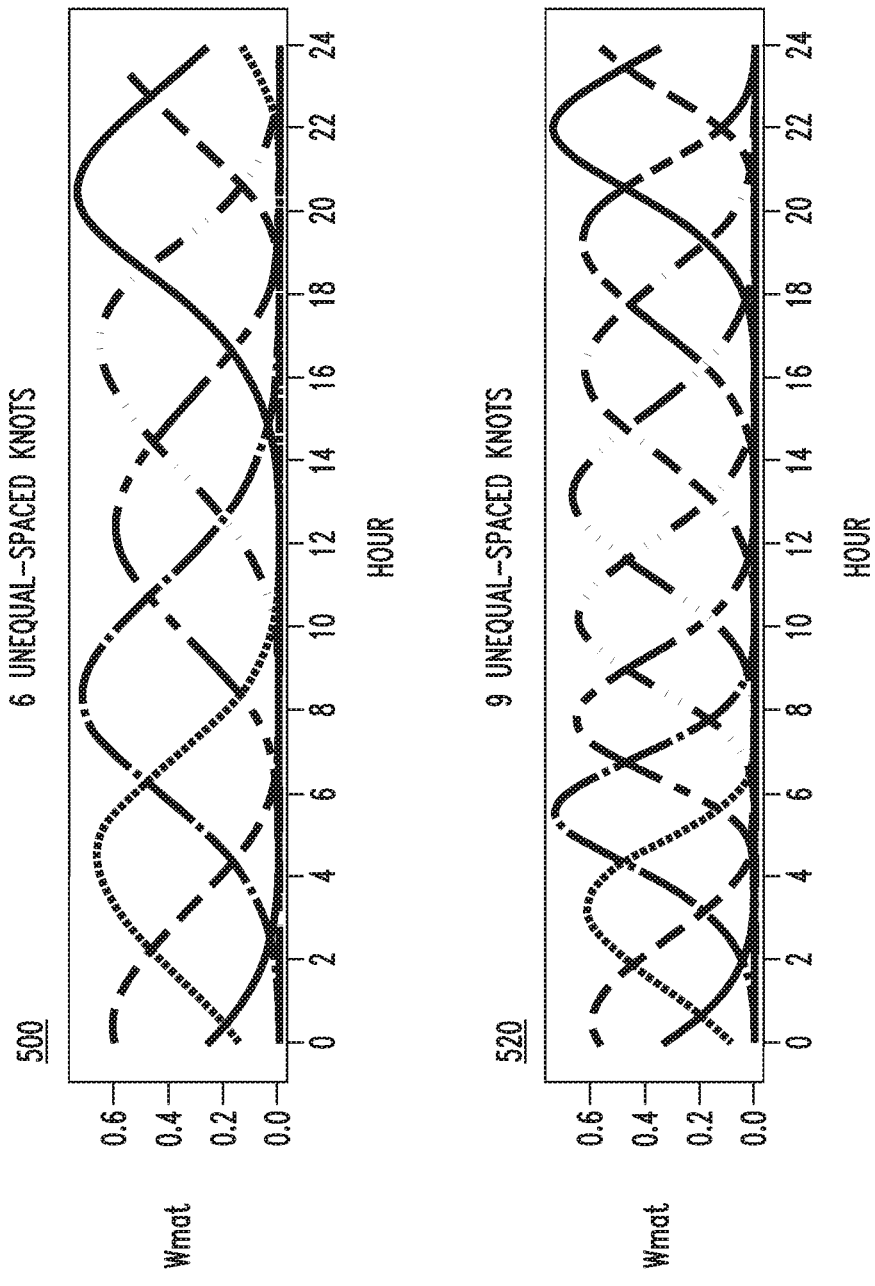

700

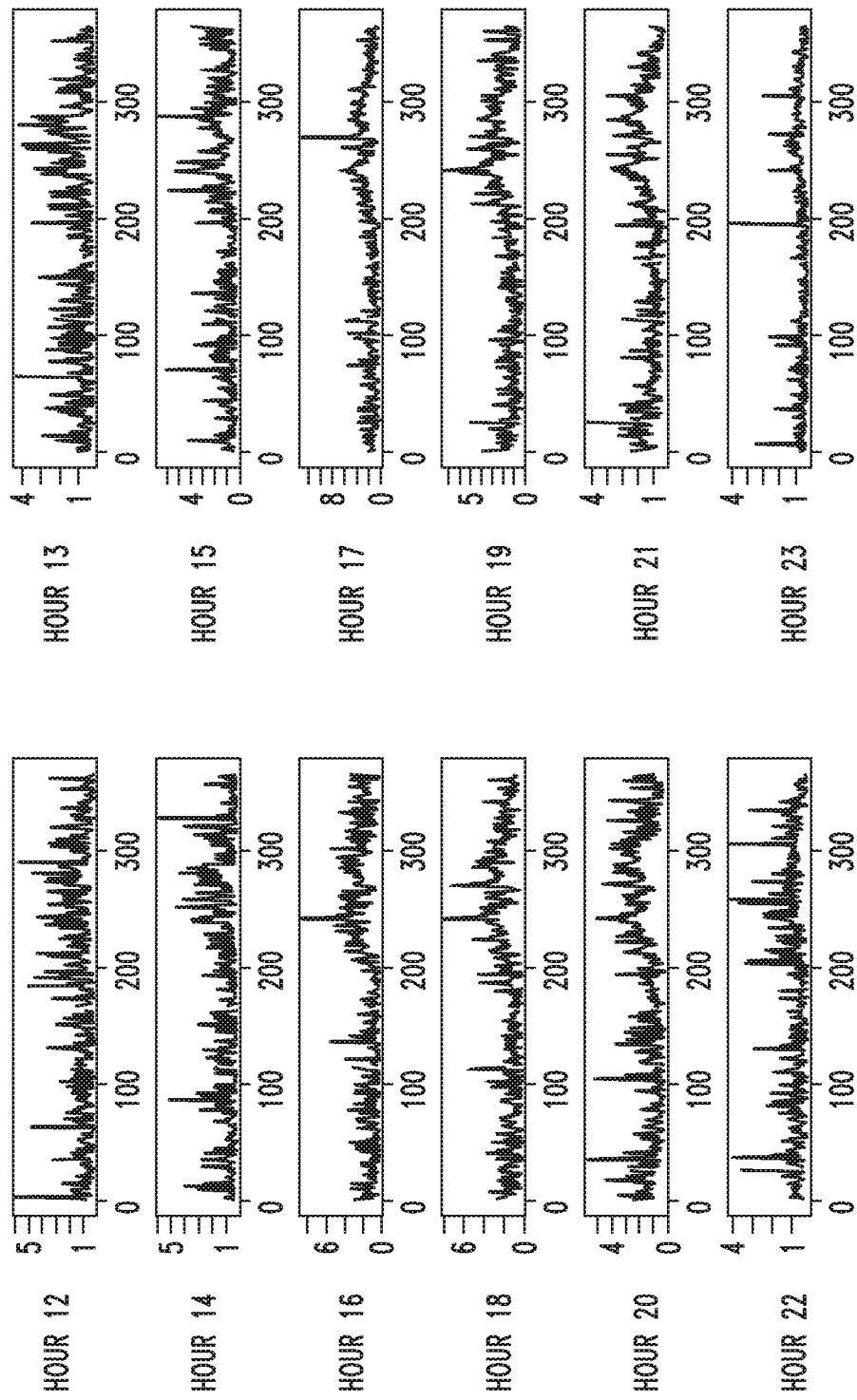

800

SYSTEM AND METHOD FOR MODELING AND FORECASTING CYCLICAL DEMAND SYSTEMS WITH DYNAMIC CONTROLS AND DYNAMIC INCENTIVES

This invention was made with Government support under Contract No. DE-OE0000190 awarded by the Department of Energy. The government has certain rights to this invention.

TECHNICAL FIELD

The field generally relates to a system and method for modeling and forecasting cyclical demand systems, and more particularly, cyclical demand systems in the presence of dynamic control or dynamic incentives.

BACKGROUND

A notable characteristic of many cyclical demand systems is the presence of periods of peak demand, which are typically of relatively short duration and occur at more or less fixed times within the overall demand cycle. The residential electricity grid is a well-known example of such a cyclical demand system, in which the daily demand cycle typically has two peak periods that occur during the morning and evening hours. Besides this daily demand cycle, the residential electricity grid may also have secondary weekly or annual demand cycles. Peak periods may also be identified within the secondary demand cycles, and may be more easily discerned when the historical demand data is appropriately aggregated to smooth out the higher-frequency demand cycles, e.g., by using daily aggregated data to examine the weekly demand cycle, or by using weekly or monthly aggregated data to examine the annual demand cycle.

A concern in such a cyclical demand system is the need to design and provision the generation and transmission resources for these short-duration peak periods. This requirement invariably entails higher capital and operating costs for the electricity grid. These costs are typically borne by all consumers, including those who have little or no electricity usage during the peak periods. The resulting pricing inequities are sometimes addressed by adopting time-of-use pricing in order to differentiate between the usage during the peak and off-peak periods of the demand cycle.

With the advent of smart metering and two-way communications in the electricity grid, referred to as the "Smart Grid", this static time-of-use pricing approach may increasingly be replaced by a more dynamic real-time pricing approach with considerably more flexibility for managing the demand profile within the overall demand cycle. The newest dynamic approaches that are being considered rely on providing consumers with accurate short-term projections of their price of electricity over the upcoming daily demand cycles. Given these projected prices, consumers may plan to limit their usage during high-price peak periods or to migrate their usage to low-price off-peak periods; either action leading to a more uniform load-curve profile over the entire demand cycle, which is an operational goal for the electricity grid.

From the perspective of short-term load forecasting in the residential electricity grid, the entire daily demand cycle can be considered as an important unit for understanding the demand substitution effects due to dynamic pricing. This is because residential (and some business) consumers typically have some flexibility in scheduling their daily usage requirements, but considerably less flexibility in moving their usage from one day to another. For example, space heating tends to comprise the largest component of residential electricity load during the winter months. In this case, the individual heating schedules may be flexible enough to incorporate preheating by a few hours in anticipation of higher prices during the ensuing peak period. However, such a preheating strategy is unlikely to be effective across the boundaries of the daily demand cycle.

The impact of dynamic pricing incentives on the short-term demand reduction and demand substitution within the daily load cycle is of interest from the operational perspective in the Smart Grid. However, there has been little effort in developing techniques to incorporate these dynamic pricing effects into the modeling and forecasting of the daily load cycle.

SUMMARY

In general, exemplary embodiments of the invention include systems and methods for modeling the shape and evolution of a demand cycle in a cyclical demand system using historical data, and for using the evolution model for forecasting the future demand cycle, particularly under the use of dynamic controls such as dynamic price and price-like incentives. When consumers receive information from their supplier (e.g., electricity supplier) about current and/or future prices of the supplied product, consumers may change their consumption behavior or shift load patterns so that they are using more of the supplied product during the periods when it is cheaper to do so. Embodiments of the present invention provide methods and systems for generating demand forecasts that incorporate this type of load shifting behavior. In other words, embodiments of the present invention provide systems and methods for modeling and forecasting how the load shape will change in the wake of pricing information to which consumers are reacting.

According to an exemplary embodiment of the present invention, a system for modeling a cyclical demand system comprises a data module capable of obtaining historical data on one or more demand measurements over a plurality of demand cycles and historical data on incentive signals over the plurality of demand cycles, a modeling module capable of receiving the historical data on the one or more demand measurements and the incentive signals, and using the received historical data to construct a model, wherein the modeling module comprises a specification module capable of specifying a state-space model, and variance parameters in the model, and an estimation module capable of estimating unknown variance parameters.

According to an exemplary embodiment of the present invention, a method for modeling a cyclical demand system comprises obtaining historical data on one or more demand measurements over a plurality of demand cycles, obtaining historical data on incentive signals over the plurality of demand cycles, constructing a model using the obtained historical data on the one or more demand measurements and the incentive signals, wherein constructing the model comprises specifying a state-space model, specifying variance parameters in the model, and estimating unknown variance parameters.

According to an exemplary embodiment of the present invention, an article of manufacture comprises a computer readable storage medium comprising program code tangibly embodied thereon, which when executed by a computer, performs method steps for modeling a cyclical demand system, the method steps comprising obtaining historical data on one or more demand measurements over a plurality of demand cycles, obtaining historical data on incentive signals over the plurality of demand cycles, constructing a model using the obtained historical data on the one or more demand measurements and the incentive signals, wherein constructing the model comprises specifying a state-space model, specifying variance parameters in the model, and estimating unknown variance parameters.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 4C illustrates the time series for the corresponding price incentives (increased prices may be regarded as disincentives rather than incentives for the consumption of electricity) provided to the same group of residential customers and over the same time period as in FIGS. 4A-4B, which can be used for creating a model of a cyclical demand system according to an exemplary embodiment of the present invention.

FIG. 5 illustrates basis functions that are used to represent the daily demand cycle (or equivalently the daily load curve), according to exemplary embodiments of the present invention.

FIGS. 7A-B illustrate time series data of hourly loads which is historical data used in the creation of a model, according to an embodiment of the present invention.

DETAILED DESCRIPTION OF EXEMPLARY EMBODIMENTS

Figure 1:
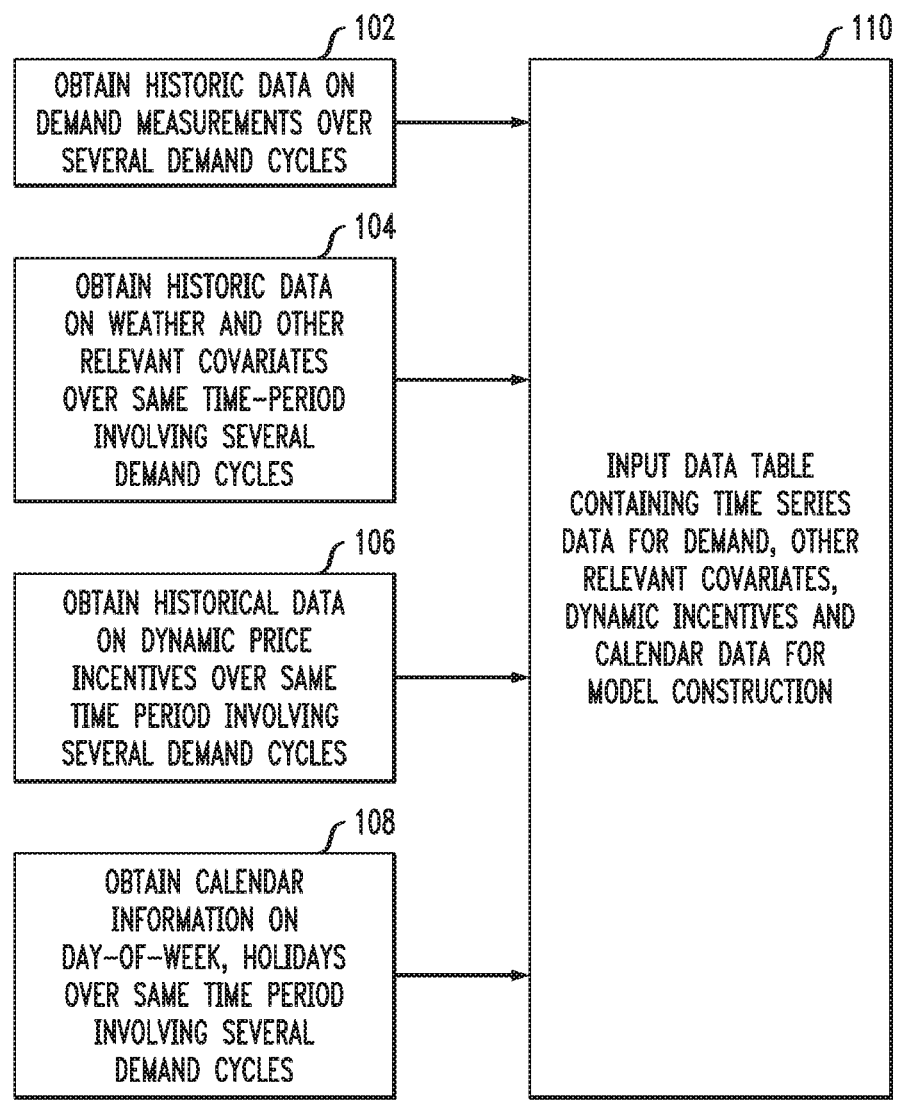
FIG. 1 illustrates steps for obtaining data sets required for creating a model of a cyclical demand system, according to an exemplary embodiment of the present invention.

Exemplary embodiments of the invention will now be discussed in further detail with regard to systems and methods for the modeling of cyclical demand systems in the presence of dynamic controls or dynamic incentives. This invention may, however, be embodied in many different forms and should not be construed as limited to the embodiments set forth herein.

For purposes of explanation, embodiments of the present invention may be discussed in connection with electricity generation and distribution. However, it is to be understood that the embodiments of the present invention are not limited to electricity generation and distribution, and may be applied to other cyclical demand systems, including, but not limited to, traffic (e.g., road, bridge), parking and transportation, and other utility systems (e.g., gas, network and computing services).

Embodiments of the present invention relate to systems and methods for modeling and forecasting cyclical demand systems, which are under some form of dynamic control or dynamic incentive scheme. The embodiments of the present invention can be applied to, for example, applications where a cyclical demand system is designed to satisfy the peak demand rather than the average demand and, as a result, infrastructure and operating costs are significantly increased. As stated above, the embodiments of the present invention are applicable to applications including, but not limited to, traffic, parking and transportation, utilities, etc.

Cyclical demand systems are inherently market-inefficient since satisfying the peak interval demand incurs higher capital and marginal operating costs that satisfying average demand. As a result, all consumers, including the consumers who have had no service during the peak intervals, may pay for these higher marginal costs. Accordingly, market efficiency can be improved by modifying the shape of the demand profile in cyclical demand systems to reduce the peak usage and make it closer to the average usage in the demand cycle, by using price and price-like incentives.

Modeling dynamic control systems in cyclical demand systems can be complex since demand can be shifted forwards and/or backwards in time within the same cycle, or advanced or deferred to another demand cycle. The effectiveness of dynamic controls may depend on making the consumer aware of magnitude of the controls before the onset of the demand cycle (e.g., these controls may be provided to the consumer on the previous day for a demand system for a daily cycle). In many cases, this is compatible with the requirement of a day-ahead planning cycle. However, consumers may also be provided with the controls for several cycles in advance, or may anticipate the extent of these controls based on their prior experience, and these values may be fine-tuned based on the latest information for the day-ahead cycle. In any case, any instantaneous or anticipated changes in the dynamic controls will lead to corresponding deferments or advancements in the consumption profile, and will be reflected in the shape of the daily curve. The precise patterns of demand shifting, however, may be greatly influenced by the nonlinear covariate effects of the price-like incentive in consumer utility functions, and may also be confounded with other covariate effects such as weather and climate effects.

There are many limitations of the prior art for the modeling of cyclical demand systems with dynamic controls, and, in particular, those cyclical demand systems that are characterized by one or more short intervals of peak demand during the cycle. Accordingly, the embodiments of the present invention are motivated, at least in part, by these limitations in the prior art, as well as by the enhanced capabilities enabled by current trends in data measurement and data collection in cyclical demand systems. By way of non-limiting example, the smart grid technologies for the electricity grid that feature demand response, price-sensitive appliances and electric loads, real-time pricing, and two-way communication of price and demand signals between suppliers and consumers, can be used in conjunction with the embodiments of the present invention.

Considering the residential electricity grid as an example of a cyclical demand system, then, the associated demand cycle has a daily period and the corresponding daily demand profile is known as the load curve. Embodiments of the present invention provide systems and methods for modeling residential electricity load curves with respect to dynamic control using price and price-like incentives. With the introduction of smart metering technologies and two-way communications, fine-grained usage data (e.g., in 5 to 15 minute intervals) can be collected from individual households and residential sub-grids. Embodiments of the present invention can handle such fine-grained data without excessive computational costs and without modeling simplifications that would negate the utility of collecting this fine-grained data. Furthermore, embodiments of the present invention take into account aspects of the fine-grained data, which will be quite noisy within the same demand period, and that each fine-grained interval will be quite noisy from one day to the next, even though the overall load pattern excluding this fine-grained noise may be quite stable and continuous within and across these daily cycles.

The systems and methods according to embodiments of the present invention also handle usage substitution within the same demand cycle, including any anticipatory and deferred demand based on, for example, published day-ahead price schedules, which is required for understanding the effects of dynamic control and dynamic incentives on the load curve and demand response. As a result, embodiments of the present invention include flexible, nonlinear and cross-elasticity effects in the factors shaping the demand cycle, and implement realistic reduced-order models for incorporating dynamic controls.

By way of non-limiting example, the electricity grid comprises several generation and distribution entities, including transmission system operators, balancing authorities, and individual utilities, who may finalize their electricity generation and distribution commitments, and their bulk electricity purchases on a day-ahead basis. These entities are, therefore, in a position to publish their short-term forward price schedules. Based on these short-term forward price schedules, consumers with access to these prices can appropriately plan and modify their usage. It is contemplated that the demand response to these price signals may be automated through the use of price-sensitive appliance controllers and thermostats that can appropriately respond to price signals (e.g., forward price signals) based on the consumer-specified settings (e.g., comfort level). Based on the demand forecasts in this scenario, the generation and distribution entities can plan and provision their short-term electricity generation and spinning reserve requirements. In accordance with embodiments of the present invention, this approach to providing load forecasts is applicable to any entity in the electric grid hierarchy (e.g., all smart grid entities), or any entity that is part of a cyclical demand system, and that is concerned with dynamic demand response and short-term load forecasting for operational planning and decision support.

Embodiments of the present invention may be applicable to dynamic real-time pricing in the electricity grid in connection with the increasing role of renewable energy sources in electricity generation. For example, the electricity generation from wind energy sources may not be correlated with the usual residential demand cycle, making it necessary to store and regulate the usage of this intermittently generated power. However, reliable short-term forecasts for the wind energy generation levels (e.g., over a period of hours to days) may be available for the wind-energy power generation, making it possible to develop forward price schedules that give consumers an incentive to modify their usage patterns to absorb the intermittent supply. The use of dynamic pricing in this context is particularly suitable for loads, such as electric car batteries, whose time-of-use characteristics have a large discretionary component. With the appropriate price incentives, these loads can be scheduled during periods of increased generation capacity due to the activation of intermittent wind, or other renewable energy sources. Although large-scale storage technologies for electricity are rapidly being developed by utilities that will make it possible to absorb and regulate the intermittent supply from renewable sources, a direct consumer demand response may be attractive since it can be implemented with lower infrastructure investment and costs.

Implementation of dynamic pricing for residential electricity consumers need not require complex infrastructure or expensive technology upgrades. The dynamic price signals can, for example, be provided through a simple internet portal or an in-home display device, and can be expected to induce a specific predictable response over an aggregated customer population. Here, the response from individual consumers who are shown the same dynamic price incentive signals may be highly variable depending on their unknown or unmeasured circumstances, such as the frequency with which they check the portal for information on the incentive values. Although individual consumer behaviors may be extremely difficult to predict, their aggregate group response can be expected to smooth out the individual behaviors and enable more robust load prediction.

The modeling methodology in accordance with embodiments of the present invention has been evaluated using data from the Olympic Peninsula Project (referred to herein as "OlyPen"), which was obtained during 2006-2007, from a set of residential consumers who participated in a real-time metering and billing experiment to evaluate the impact of various fixed and variable pricing schemes on the electricity load profile. In particular, one group of customers participated in a dynamic pricing scheme in which the instantaneous price of electricity was determined by the prevailing marginal costs of electricity from the various sources of generation that had to be commissioned to meet the required demand. These customers were provided with the instantaneous price at 15-minute intervals, and not with any explicit forward price schedules; however, it is possible that these customers could have inferred the likely future prices from their own experience, and made corresponding short-term demand substitutions. Each residence was installed with price-sensitive controllers and thermostats that, based on their set-point and comfort-level settings, initiated price bids for the required demand. The corresponding generation resources in the distribution sub-network, based on their marginal generation costs, initiated price bids for the available supply. A double-auction market with settlement at intervals of 5 minutes provided market-clearing values of the dynamic price, and the corresponding level of matching supply and demand. In practice, in the OlyPen data, the electricity generation sources that provided the dynamic price bids were only commissioned very infrequently, during the few periods when the instantaneous electricity demand exceeded the provisioned base capacity of the residential sub-network. In spite of these limitations, the data from the OlyPen project was suitable for a preliminary evaluation of embodiments of the present invention.

Given the nature of the data obtained from the OlyPen project, embodiments of the present invention are described in connection with the modeling and forecasting of the residential load-curve profile. However, it is to be understood that the proposed modeling approach is not limited to residential applications, and can be readily extended to commercial and industrial load profiles as well. In accordance with embodiments of the present invention, factors such as the short-term economic activity and the workforce vacation patterns, which typically drive pricing contracts and usage patterns for commercial and industrial usage, would be incorporated into the relevant details for the modeling approach in those cases.

Embodiments of the present invention take into account that a large portion of the residential electricity load is concerned with cooling and heating, and that local climate conditions can play an important role in the residential load-curve model. For example, the residential consumers in the OlyPen project were located in a coastal region of the U.S. Pacific Northwest, where the summer temperatures are moderate so that the cooling load is small, and the winter temperatures are severe so that the heating load is significant. It is understood that residential consumers in other geographic locations may have a different local climate, and therefore different heating and cooling load profiles as well. In accordance with embodiments of the present invention, these climate and temperature dependencies can be broadly specified in proposed load curve models, and appropriate model parameters can be suitably estimated from time series of the residential demand data for a geographic region of interest.

It is contemplated that embodiments of the present invention can be applied on a large scale to, for example, a framework in which the various distribution entities from, for example, different states and different utilities, will exchange certain transactive signals indicating their anticipated forward prices and forward loads. The demand forecasting systems and methods according to embodiments of the present invention may enable the forecasting of short-term elastic and inelastic loads within this transactive signal framework, and for various scenarios associated with participating utilities. Embodiments of the present invention may be applicable to situations where price incentive signals and demand forecast requirements occur at different time-scales and different levels of aggregation, ranging from, for example, every 5 minutes for the next hour to every 24 hours for the next 4-6 days. The systems and methods for forecasting disclosed herein may be fast enough for the shortest time-scales, accurate enough for the longest time-scales, and reliable enough to be used in a distributed setting where there may be considerable uncertainty in the availability and quality of the observational data.

Figure 4A:
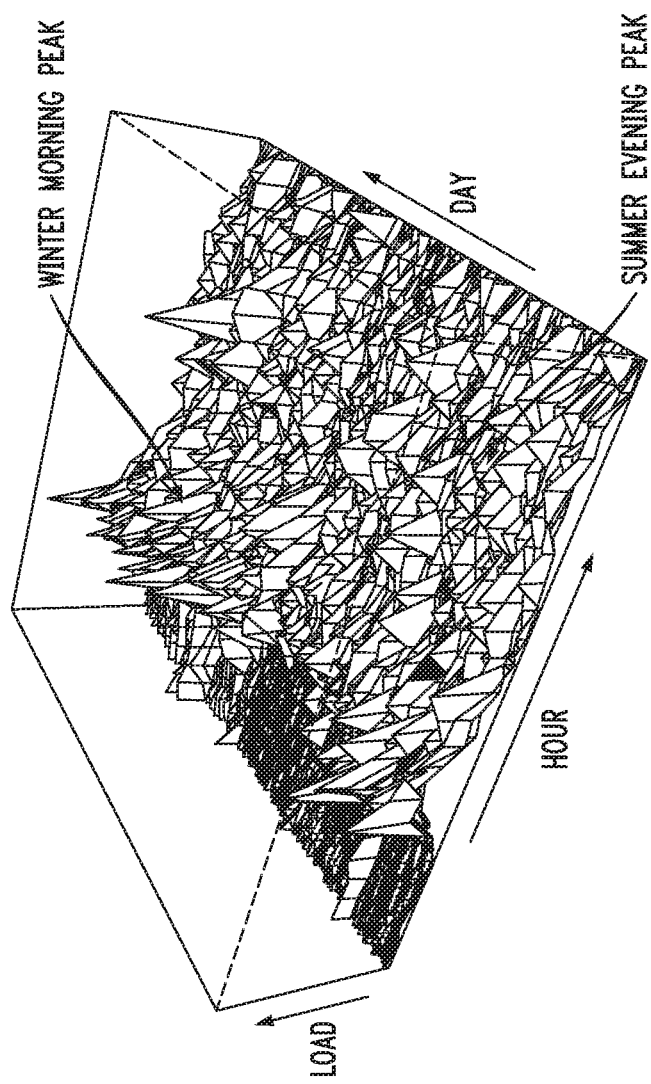
FIG. 4A illustrates the time series for the load curve for a group of residential electricity customers on the same residential sub-grid, which can be used for creating a model of a cyclical demand system according to an exemplary embodiment of the present invention.

Referring, for example, to FIG. 1, steps for obtaining data sets required for creating a model of a cyclical demand system, according to an exemplary embodiment of the present invention, include obtaining historic data on demand measurements over several demand cycles 102, obtaining historic data on weather and other relevant covariates over the same time-period involving several demand cycles 104, obtaining historical data on dynamic price incentives over the same time period involving several demand cycles 106, and obtaining calendar information on day-of-week, holidays over the same time period involving several demand cycles 108. Historical data on demand measurements includes actual electricity usage at regular time intervals, e.g., every hour, 15 minutes, etc. over a given period (e.g., 3 months), of a group of consumers for whom forecasts are being made. The historic data is based on use patterns of consumers who have received the dynamic incentives. According to an embodiment of the present invention, the dynamic incentives include incentive signals supplied to the customer which include, for example, actual pricing and/or more general indications that the price will be high or low over a given time period. FIG. 4A provides a graphical illustration of historic demand data, illustrating daily load-curve profiles (according to hour and day) over a one-year period. More specifically, FIG. 4A illustrates the time series for the load curve for a group of residential electricity customers on the same residential sub-grid, which can be used for creating a model of a cyclical demand system according to an exemplary embodiment of the present invention, including peak usages.

Figure 4B:
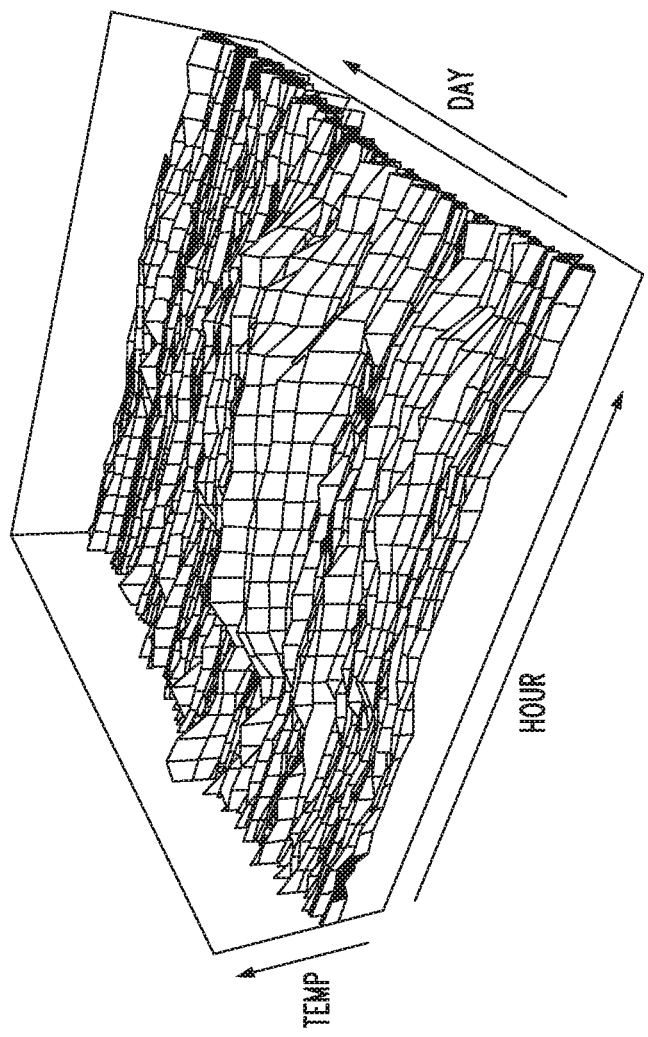
FIG. 4B illustrates the time series for the corresponding temperatures for the same group of residential customers and obtained over the same time period as in FIG. 4A, which can be used for creating a model of a cyclical demand system according to an exemplary embodiment of the present invention.

With regard to steps 104 and 108, the data on elements that affect the demand for electricity is obtained. Such elements include, for example, weather (e.g., temperature, humidity, extended cold or hot periods, etc.), current events, unemployment, holidays, day of week, etc. FIG. 4B provides a graphical illustration of daily temperature profiles for a one-year period that can be collected as per block 104.

FIG. 4B illustrates the time series for the corresponding temperatures for the same group of residential customers and obtained over the same time period as in FIG. 4A.

With regard to step 106, the actual price incentives over a given historical time period are obtained. The price incentive data can be in the form of records of actual pricing and/or incentive signals received by the consumers over a given period. FIG. 4C provides a graphical illustration of a daily price incentive profile for a one-year period that can be collected as per block 106. FIG. 4C illustrates the time series for the corresponding price incentives (increased prices may be regarded as disincentives rather than incentives for the consumption of electricity) provided to the same group of residential customers and over the same time period as in FIGS. 4A-4B, which can be used for creating a model of a cyclical demand system according to an exemplary embodiment of the present invention. According to an embodiment, the time period over which the data is collected is the same time period for each type of data.

At block 110, the historical data and calendar information gathered in blocks 102, 104, 106 and 108 is input into a data table containing time series data for demand, other relevant covariates, dynamic incentives and calendar data, which is used for model construction. As part of construction of the model, patterns in the historical data and calendar information can be obtained, and calibration can be performed to determine what data is random noise, and can be ignored.

Figure 2:
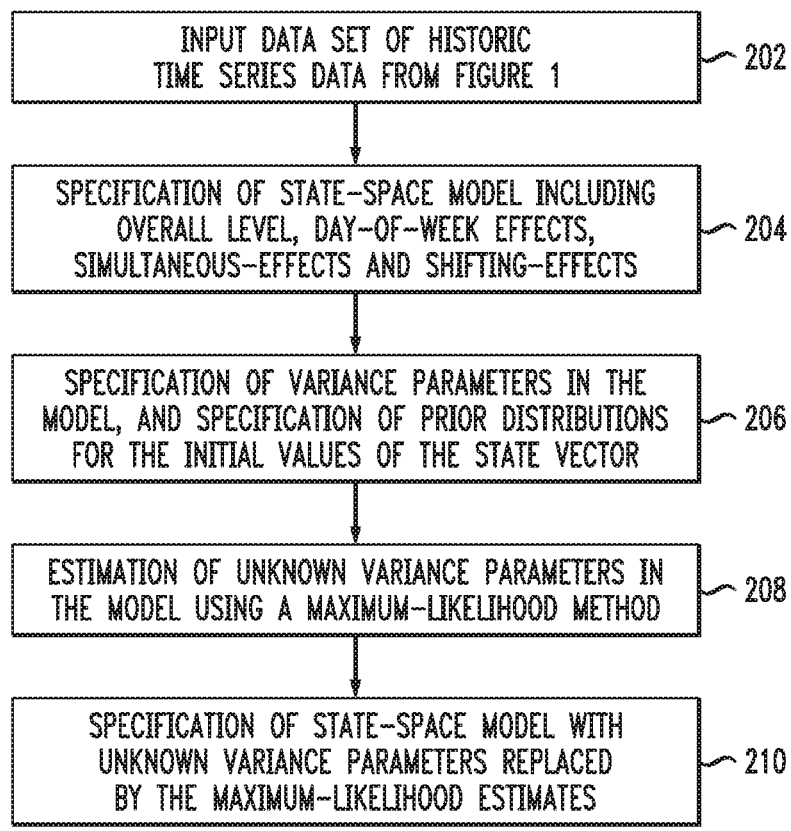
FIG. 2 illustrates steps of a method for creating a model of a cyclical demand system from time series data, according to an exemplary embodiment of the present invention.

Referring, for example, to FIG. 2, steps of a method for creating a model of a cyclical demand system from time series data, according to an exemplary embodiment of the present invention, include inputting the data set of historic time series data from FIG. 1 (block 202), specifying a state-space model including overall level, day-of-week effects, simultaneous-effects and shifting-effects (block 204), specifying of variance parameters in the model, and specifying prior distributions for the initial values of the state vector (block 206), estimating of unknown variance parameters in the model using a maximum-likelihood method (block 208), and specifying of a state-space model with unknown variance parameters replaced by the maximum-likelihood estimates (block 210).

Embodiments of the present invention model the residential electricity load curve in a smart grid scenario in which the customers receive an incentive signal that is related to the actual or forecast price of electricity at various time intervals in the daily demand period.

In step 204, the state-space model contains components that correspond to different patterns of variation in the daily load curve for electricity. These components are represented by terms in eq. (3) set forth below. In accordance with embodiments of the present invention, the following are non-limiting explanations of terms found in step 204:

"Overall Level" is the typical or expected shape of the load curve in the absence of any known factors that may influence demand for electricity. It corresponds to the term $\mu_{db}$ in eq. (3) and is expected to change slowly from day to day, following eq. (4) set forth below.

"Day-Of-Week Effect" is a specification of how the load curve varies across different days of the week (e.g., Saturdays and Sundays have a lower and later morning peak than weekdays). It corresponds to the term $\delta_{db}^{(O)}$ in eq. (3). In accordance with an embodiment of the present invention, day-of-week effect can be replaced by the more general "calendar effects", referring to any pattern of variation in the load curve for a particular day that can be explained by the characteristics of that day, including day-of-week effects, holiday effects, and other possible effects influencing a variation in the load curve.

"Simultaneous Effect" is the variation in the load curve due to an external covariate whose value at a certain time point affects demand for electricity at that time point. It corresponds to the term $\tilde{X}_{db}$ in eq. (2) set forth below and to the effect of temperature, $\tilde{X}_{db}^{(t)}$ in eq. (3).

"Shifting Effect" is the variation in the load curve due to an external covariate whose value at a certain time point can affect demand for electricity at any time during that day. It corresponds to the term $\tilde{Z}_{dc}$ in eq. (2) and to the effect of price incentive, $\tilde{P}_{dc}$ in eq. (3).

In step 206, prior distributions for the initial values of the state vector are part of the model specification (see discussion after eq. (19) below). In connection with block 206, the overall load curve/pattern of demand at each part of a time period (e.g., at each hour of a day) varies due to a variety of factors (e.g., seasonal variations). In other words, the speed of evolution of the load curve is controlled by parameters that describe the variance of changes in load curve from one time to another time. Based on the historical data, a determination is made as to what time intervals are to be included in the model. These time intervals may range from, for example, 5 minutes to 1 hour, depending on the frequency at which the price incentive signals are transmitted, and the granularity of the metering and data collection in the smart grid implementation. The duration of these time intervals can vary through the day; for example, a smaller time interval may be used during the morning and evening peak periods, when there are significant variations in the demand, while a larger time interval may be used at night when there is little variation expected in the demand. The duration of these time intervals can also vary from one day to another; for example, during weekends, the morning and evening peaks are typically less pronounced and a larger time interval may be used. Nonuniform and varying time intervals for the observational data may be incorporated into the modeling methodology. For simplicity of exposition and not limitation, this disclosure uses fixed time intervals of equal duration for each day of the data.

With respect to step 208, once the variance parameters are specified, the unknown variance parameters for use in the model at step 210 are estimated. In general, the variance parameters are numerical parameters which are estimated through, for example, calibration of the model based on historical data.

Each customer can react to an incentive signal that indicates an increase in price during a certain period in two ways: by a simultaneous reduction in the load during this period, or by moving the scheduled load to an earlier or later period in the same day with a lower price. Because of the nature of the daily residential activities, this scheduled load may rarely be moved to another day and that demand substitution effects between two separate demand cycles may not be significant. The proposed forecasting model according to an embodiment of the present invention therefore incorporates only intraday demand reduction and substitution effects that arise as a consequence of the dynamic price incentive signals.

In addition to the dynamic price incentive signal, the demand for electricity is affected by other factors, such as, for example, calendar effects and local weather and climate conditions. With reference to blocks 104 and 108 of FIG. 1, a proposed model incorporates effects due to the day of week, special days and holidays, and the instantaneous temperature. When used for real-time forecasting, the model can use both a forward price incentive signal and forward values for temperature. Since detailed and accurate short-term weather forecasts are available for most regions, these forecasts may be used as the required short-term forward values for the temperature during the forecast period.

A daily load curve may be treated as a set of M demand values recorded at equally spaced time points during a day. The time intervals may be sufficiently small to capture the rapid changes that occur during the peak-demand periods of the day, which may be only one or two hours in duration. For example, the OlyPen data described herein below were obtained for time intervals of 15 minutes, corresponding to M=96.

Letting $y_{dm}$, m=1, . . . , M, denote the demand during the intervals of day d, $y_{dm}$ is modeled as a sum of smooth basis functions plus an error term:

$$y_{dm} = \sum_{b=1}^{B} \alpha_{db} f_{mb} + u_{dm}. \quad (1)$$

Here B is the number of basis functions; $f_{mb}$, m=1, . . . , M, are the values of the bth basis function during day d; $\alpha_{db}$, b=1, . . . B, are the coefficients of the basis functions for day d; and $u_{dm}$, m=1, . . . , M, are random variables with mean zero, with covariances given by $cov[u_{d1} \ldots u_{dM}]=U$.

According to an embodiment of the present invention, periodic cubic splines are used to model the daily load curve. This basis allows the knots to be closely spaced in periods where large variations in the load curve profile are expected, enabling a good fit to be obtained with fewer basis functions than with alternatives such as trigonometric functions. Since the individual basis functions have local support, their coefficients can be interpreted as the localized influence of the basis function support on the overall load curve; similarly, the dynamics and regression characteristics of these coefficients also represent the localized influence of the support of the basis function on the overall load curve model.

The choice of the number B of periodic cubic-spline basis functions and of the corresponding knots is problem dependent. B«M can be chosen for dimensionality reduction and to incorporate smoothness between successive time intervals. According to an embodiment, the knots are chosen subjectively to achieve a good approximation to the typical daily load curves of a given data set. Over a large collection of data sets 8 to 12 basis functions may be used, with knots clustered around morning and evening peak periods.

The daily load curve is modeled as a weighted sum of basis functions, and a day's load pattern is summarized by the values of the basis function coefficients for that day, $\{\alpha_{db}, b=1, \ldots, B\}$. The influence of explanatory factors is modeled by their effects on these basis function coefficients. This approach is convenient in that the modeling of factor effects is independent of the time-granularity of the load observations. Thus, for example, the number and meaning of model parameters that measure the effects of explanatory factors are the same regardless of whether load observations are made every hour or every 15 minutes.

A basis function corresponds to a particular intraday pattern of usage and the effect of an explanatory factor on a basis function's coefficient logically depends on how the factor combines with the basis function's usage pattern. For example, if a basis function's values are largest in a time period from 8:00 to 10:00, then the coefficient of that basis function will be most sensitive to the values that the explanatory factor takes within this time period. In an extreme case, if a basis function is zero in some time interval within the day (as is the case for B-spline basis functions, for example) then values of an explanatory factor within that time interval should have no direct effect on the coefficient of the basis function. In the general case, consider an explanatory variable X that during day d takes values $X_{dm}$, m=1, . . . , M. The interaction on day d of X with the bth basis function is $\tilde{X}_{db} \equiv \sum_{m=1}^{M} X_{dm} f_{mb}$. The effect of X on the load curve for day d is naturally modeled in (1) by letting each coefficient $\alpha_{db}$ be a function of $\tilde{X}_{db}$ (a simultaneous effect) or of the entire set $\tilde{X}_{dc}$, c=1, . . . , B (which allows for shifting of load from one basis function pattern to another in response to a known or expected intraday pattern in X). Thus, for example, if in model (1) the effects of an overall level are included, a variable X with a simultaneous effect and a variable Z with a shifting effect, all effects being linear, then the model for $\alpha_{db}$ would be given by $$\alpha_{db} = \mu_b + \beta_b \tilde{X}_{db} + \sum_{c=1}^{B} \gamma_{bc} \tilde{Z}_{dc}. \quad (2)$$

Referring to step 204 in FIG. 2, according to an embodiment, an actual model for the basis function coefficients $\alpha_{db}$ includes an overall level, a day-of-week effect, a holiday effect, dependence on temperature, dependence on the incentive signal, and a random disturbance. The model for $\alpha_{db}$ is $$\alpha_{db} = \mu_{db} + (1-h_d)\delta_{db}^{(0)} + h_d z_b + \sum_{\ell=1}^{L} \beta_b^{(\ell)} \tilde{X}_{db}^{(\ell)} + \sum_{c=1}^{B} \varepsilon_{bc} \tilde{P}_{dc} + v_{db}, \quad (3)$$

with $$\mu_{db} = \mu_{d-1,b} + w_{db}^{(\mu)}, \quad (4)$$

$$\delta_{db}^{(0)} = \delta_{d-1,b}^{(6)} + w_{db}^{(\delta)}, \quad (5)$$

$$\delta_{db}^{(s)} = \delta_{d-1,b}^{(s-1)}, \quad (6)$$

$$s = 1, \ldots, 6.$$

Here $\mu_{db}$ is the local level of the process; $\delta_{db}^{(s)}$ is the day-of-week effect for s days before day d, modeled by terms $\delta_{db}^{(s)}$, s=0, 1, . . . . . , 6, that sum to zero; $z_b$, b=1, . . . , B, is the load curve for a holiday or other special day; $h_d$ is an indicator of whether day d is a holiday; $\tilde{X}_{db}^{(l)} \equiv \sum_{m=1}^{M} X_{dm}^{(l)} f_{mb}$ is the interaction of the lth temperature variable $X_{dm}^{(l)}$ with the bth basis function; $\beta_b^{(l)}$ is the regression coefficient of $\tilde{X}_{db}^{(m)}$;

$$\tilde{P}_{db} \equiv \sum_{m=1}^{M} P_{dm} f_{mb} \quad (7)$$

is the interaction of the transformed price $P_{dm}$ with the bth basis function; $\varepsilon_{bc}$ (b, c=1, . . . , B) model the elasticity of demand with respect to price, as discussed below; $v_{db}$, $w_{db}^{(\mu)}$, and $w_{db}^{(\delta)}$ are random noise terms with mean zero and $cov[v_{d1} \ldots v_{dB}]=V$, $cov[w_{d1}^{(\mu)} \ldots w_{dB}^{(\mu)}]=W^{(\mu)}$, and $cov[w_{d1}^{(\delta)} \ldots w_{dB}^{(\delta)}]=W^{(\delta)}$; $v_{db}$, $w_{db}^{(\mu)}$, and $w_{db}^{(\delta)}$ are independent of each other and of $u_{dm}$ in (1).

The level $\mu_{db}$ and the day-of-week terms $\delta_{db}^{(s)}$ are dynamic, with each day's values following a random walk in B dimensions. Allowing these terms to vary with time is intended to capture any seasonal variation of the load curve across the year that is not explained by the temperature variables. In modeling daily load, a random-walk pattern of variation may be adequate. The holiday, temperature, and price effects are treated as static. They too could be modeled as dynamic components with random-walk (or other) dependence.

The holiday indicator $h_d$ could be a binary variable or could take fractional values between 0 and 1 to reflect days where the electric load pattern is intermediate between an ordinary weekday and a full holiday. These values can be taken as specified a priori, without attempting to estimate them from the data.

Referring to step 204 in FIG. 2, the effect of temperature is modeled by a set of simultaneous-effect explanatory variables $X_{dm}^{(l)}$, $l=1, \ldots, L$, each of which is a transformation of the measured temperature. One possible transformation is to use variables representing cooling degrees and heating degrees. An alternative is to use a set of natural cubic spline basis functions that has the same linear behavior as cooling degrees and heating degrees for high and low temperatures respectively, but can also capture the continuous and nonlinear dependence of demand on temperature for intermediate values of temperature.

Referring to step 204 in FIG. 2, the effect of price is modeled by a single shifting-effect explanatory variable $P_{dm}$ that may be the actual price or some nonlinear transformation of the price. For example, a logistic transformation of price can capture the property that the elasticity will tend to zero for very low prices (when the demand is already saturated to full capacity) and for very high prices (when the demand is effectively at the practical minimum level). Alternatively, if the observed demand is log-transformed prior to modeling then a log-transformed price would allow the corresponding estimated coefficients to be directly interpreted as demand elasticities.

The coefficients $\varepsilon_{bc}$ model the price elasticity of demand: specifically, $\varepsilon_{bc}$ measures the effect on the coefficient of the bth basis function of changing the price that is in effect during the span of the cth basis function. According to an embodiment, the simultaneous elasticities $\varepsilon_{bb}$ are negative and the crosselasticities $\varepsilon_{bc}$, $b \neq c$, are positive. In accordance with an embodiment, it is expected that $\Sigma_{c=1}^{B} \varepsilon_{bc} \leq 0$ for all b (increasing the price during any part of the day should not increase the total usage during the day). The cross-elasticity coefficients enable the model to capture the effect of demand shifting by customers from time periods where the price is (or is expected to be) high to those where the price is (or is expected to be) low. Even with the dimensionality reduction provided by the use of basis functions, the number of elasticity coefficients, $B^2$, may be too large for each coefficient to be estimated reliably from the data. This is the case for the OlyPen data set, in which the periods when the price is high enough to have a clear influence on the demand occur very infrequently and rarely last more than a day or two. In many applications, therefore, price dependence may use a simplified specification in which these $B^2$ coefficients are functions of a smaller number of parameters. In accordance with an embodiment of the present invention, the simplest such specification, which is adequate for the OlyPen data, uses only two parameters, a single simultaneous elasticity $\varepsilon_S$ and a single cross-elasticity $\varepsilon_X$ for all basis functions, with $\varepsilon_{bb} = \varepsilon_S$ and $\varepsilon_{bc} = \varepsilon_X$, $b \neq c$; this implies that any demand substitution for a given basis function is equally distributed across all the other basis functions.

Referring to step 206 in FIG. 2, in accordance with an embodiment, the covariance matrix U of the random vector $[u_{d1} \ldots u_{dM}]$ in (1) is taken to be a diagonal, positive-definite matrix with M unknown parameters corresponding to the diagonal elements; serial correlation in the intraday disturbances is not considered. Similarly, the covariance matrices V, $W^{(\mu)}$, and $W^{(\delta)}$ associated with (3)-(6) are also taken to be diagonal, positive-definite matrices, each containing B unknown parameters corresponding to the respective diagonal elements. As with the price dependence, the diagonal elements of these matrices could be specified in terms of a smaller number of unknown parameters if the data are insufficient to support a fully independent specification of each diagonal element.

The model in accordance with an embodiment of the present invention may be a starting point for demand forecasting with the smart grid, and can capture what may be the more important sources of predictable variability in demand, and is simple enough that the model parameters can be estimated from available historical data. It is contemplated that many variants and extensions of the model are possible, and that the invention is not necessarily limited to the model(s) disclosed herein. For example, permitting nonzero off diagonal elements, with an appropriate parsimonious parametrization, in the covariance matrices U and V may enable short-term forecasts to make better use of local patterns of intraday variation. Estimating an optimal number of basis functions and optimal positions of the knots from historical data, using, for example, a Bayesian approach that would use prior beliefs about plausible knot positions, may enable the model to better capture the load curve patterns specific to a particular location or customer set.

The model defined above, in accordance with an embodiment of the present invention, can be expressed as a dynamic linear model. Writing the model in vector form, let $y_d = [y_{d1} \ldots y_{dM}]^T$ be a vector containing the load observations for day d; similarly define the M×B matrix $F = [f_{mb}]$, the M-vector $u_d = [u_{dm}]$, the B-vectors $\alpha_d = [\alpha_{db}]$, $\mu_d = [\mu_{db}]$, $\delta_d^{(s)} = [\delta_{db}^{(s)}](s=0, \ldots, 6)$, $z = [z_b]$, $\tilde{x}_d^{(l)} = [\tilde{X}_{db}^{(l)}](l=1, \ldots, L)$, $\beta^{(l)} = [\beta_b^{(l)}](l=1, \ldots, L)$, $\tilde{P}_d = [\tilde{P}_{db}]$, $v_d = [v_{db}]$, $w_d^{(\mu)} = [w_{db}^{(\mu)}]$, and $w_d^{(\delta)} = [w_{db}^{(\delta)}]$, and the B×B matrix $E = [\varepsilon_{bc}]$. Let $I_B$ denote the identity matrix of order B. Equations (1) and (3)-(6) can be written as $$y_d = F\alpha_d + u_d, \tag{8}$$

$$\alpha_d = \mu_d + (1 - h_d)\delta_d^{(0)} + h_d z + \sum_{l=1}^{L} \text{diag}(\tilde{x}_d^{(l)})\beta^{(l)} + E\tilde{p}_d + v_d, \tag{9}$$

with $$\mu_d = \mu_{d-1} + w_d^{(\mu)}, \tag{10}$$

$$\delta_d^{(0)} = \delta_{d-1}^{(6)} + w_d^{(\delta)}, \tag{11}$$

$$\delta_d^{(s)} = \delta_{d-1}^{(s-1)}, \tag{12}$$

$$s = 1, \ldots, 6.$$

By combining all the day-of-week effects into a single vector $\delta_d = [\delta_d^{(0)T} \ldots \delta_d^{(5)T}]^T$ and gathering the elasticities (elements of E) into a vector, equations (10)-(12) can be further written as $$y_d = F\alpha_d + u_d, \tag{13}$$

$$\alpha_d = \mu_d + G_d\delta_d + (h_d I_B)z + \sum_{\ell=1}^{L} \text{diag}(\tilde{x}_d^{(\ell)})\beta^{(\ell)} + (\tilde{p}_d^T \otimes I_B)vecE + v_d, \tag{14}$$

with $$G_d = [(1-h_d)I_B \quad 0_{B\times 5B}]; \tag{15}$$

the time evolution of $\mu_d$ and $\delta_d$ is given by $$\mu_d = \mu_{d-1} + w_d^{(\mu)}, \tag{16}$$

$$\begin{bmatrix} \delta_d^{(0)} \\ \delta_d^{(1)} \\ \delta_d^{(2)} \\ \delta_d^{(3)} \\ \delta_d^{(4)} \\ \delta_d^{(5)} \end{bmatrix} = \begin{bmatrix} -I & -I & -I & -I & -I & -I \\ I & 0 & 0 & 0 & 0 & 0 \\ 0 & I & 0 & 0 & 0 & 0 \\ 0 & 0 & I & 0 & 0 & 0 \\ 0 & 0 & 0 & I & 0 & 0 \\ 0 & 0 & 0 & 0 & I & 0 \end{bmatrix} \begin{bmatrix} \delta_{d-1}^{(0)} \\ \delta_{d-1}^{(1)} \\ \delta_{d-1}^{(2)} \\ \delta_{d-1}^{(3)} \\ \delta_{d-1}^{(4)} \\ \delta_{d-1}^{(5)} \end{bmatrix} + \begin{bmatrix} w_d^{(\delta)} \\ 0_{B\times 1} \\ 0_{B\times 1} \\ 0_{B\times 1} \\ 0_{B\times 1} \\ 0_{B\times 1} \end{bmatrix}, \tag{17}$$

in which all unsubscripted I and 0 matrices are of dimension B×B. The terms in equation (14) have a direct interpretation in terms of the evolution of the basis function coefficients as comprising a level term, a seasonal term with a weekly period, a set of simultaneous-effect temperature terms, and a shifting-effect price term, all of which with errors that are mutually uncorrelated. Models of this type are referred to as structural time-series models, since the model structure for each term can be independently specified and the resulting terms can be combined to obtain the overall model.

The model defined by (13)-(17) can be written as a hierarchical dynamic linear model, which in turn can be represented as a dynamic linear model (DLM) for which standard methods based on the Kalman filter recursions are available for model estimation and forecasting (see FIG. 3, elements 302-306, and corresponding discussion below).

Referring to step 204 in FIG. 2, a linear Gaussian DLM is written in the form $$y_d = \overline{F}_d \theta_d + \overline{u}_d, \quad \overline{u}_d \sim N(0, \overline{U}_d); \tag{18}$$

$$\theta_d = \overline{G}_d \theta_{d-1} + \overline{R}_d \overline{v}_d, \quad \overline{v}_d \sim N(0, \overline{V}_d). \tag{19}$$

where $d=1, \ldots, n$ is the time-like variable consistent with the notation in (1), $y_d$ is the observation vector, $\theta_d$ is a generally-unobservable state vector, $\overline{F}_d$ and $\overline{G}_d$ denote the observation matrix and state-transition matrix respectively, and $\overline{u}_d \sim N(0, \overline{U}_d)$ and $\overline{v}_d \sim N(0, \overline{V}_d)$ respectively denote the observation and state-evolution errors. The specification of the DLM is then completed by assuming a prior distribution for the initial state vector $\theta_0 \sim N(m_0, C_0)$, with $\theta_0$, $\overline{u}_d$ and $\overline{v}_d$ being mutually independent. According to an embodiment, the initial state is taken to be diffuse, with large elements on the leading diagonal of $C_0$.

The overall structure of model (13)-(17) is of the form $$y_d = F\alpha_d + u_d, \tag{20}$$

$$\alpha_d = \sum_{r=1}^{R} K_d^{(r)} \beta_d^{(r)} + \sum_{s=1}^{S} L_d^{(s)} \gamma^{(s)} + v_d, \tag{21}$$

$$\beta_d^{(r)} = H_d^{(r)} \beta_{d-1}^{(r)} + w_d^{(r)}, \tag{22}$$

$$r = 1, \ldots, R,$$

with $u_d \sim N(0, U)$, $v_d \sim N(0, V)$, and $w_d^{(r)} \sim N(0, W^{(r)})$, $r=1, \ldots, R$. This formulation contains R dynamic terms, with state vectors that evolve over time, and S static terms, with state vectors that remain constant. It is of course possible to regard static terms as dynamic terms whose innovations have a zero covariance matrix. It is a hierarchical form of the DLM (18)-(19) insofar as the state $\alpha_d$ does not evolve directly but as a sum of terms each of which evolves like the state of a standard DLM.

In accordance with embodiments of the present invention, the hierarchical DLM specified by equations (20)-(22) can be put in the standard form of the DLM in equations (18)-(19) in two ways.

In the first approach, $\alpha_d$ is eliminated from (20) and (21), to yield $$y_d = \sum_{r=1}^{R} FK_d^{(r)} \beta_d^{(r)} + \sum_{s=1}^{S} FL_d^{(s)} \gamma^{(s)} + Fv_d + u_d, \tag{23}$$

$$\beta_d^{(r)} = H_d^{(r)} \beta_{d-1}^{(r)} + w_d^{(r)}, r = 1, \ldots, R. \tag{24}$$

This can be written as a DLM with a state vector containing $\beta_d^{(r)}$, $r=1, \ldots, R$, and $\gamma^{(s)}$, $s=1, \ldots, S$.

The observation equation (18) has $$\overline{F}_d = [FK_d^{(1)} \ldots FK_d^{(R)} FL_d^{(1)} \ldots FL_d^{(S)}] \tag{25}$$

$\overline{u}_d = Fv_d + u_d$, and $\overline{U}_d = FVF^T + U$. In the state equation (19), $\overline{G}_d$ is a block-diagonal matrix with diagonal blocks $H_d^{(1)}, \ldots, H_d^{(R)}$; $I_C$; $\overline{R}_d = [I_D 0_{D\times C}]^T$; and $\overline{V}_d$ is a block-diagonal matrix with diagonal blocks $W^{(1)}, \ldots, W^{(R)}$. Here $D=\Sigma_{r=1}^{R} \dim\beta^{(r)}$ is the total number of elements in the dynamic terms and $C=\Sigma_{s=1}^{S} \dim\gamma^{(s)}$ is the total number of elements in the static terms.

In the second approach, (21) and (22) are combined to give $$\alpha_d = \sum_{r=1}^{R} K_d^{(r)} H_d^{(r)} \beta_{d-1}^{(r)} + \sum_{s=1}^{S} L_d^{(s)} \gamma^{(s)} + v_d + \sum_{r=1}^{R} w_d^{(r)}. \tag{26}$$

Equations (20), (26), and (22) define a DLM with a state vector that contains $\alpha_d$, $\beta_d^{(r)}$, $r=1, \ldots, R$, and $\gamma^{(s)}$, $s=1, \ldots, S$, and evolves according to the state equation $$\begin{bmatrix} \alpha_d \\ \beta_d^{(1)} \\ \vdots \\ \beta_d^{(R)} \\ \gamma_d^{(1)} \\ \vdots \\ \gamma_d^{(S)} \end{bmatrix} = \begin{bmatrix} 0 & K_d^{(1)} & \cdots & K_d^{(R)} & L_d^{(1)} & \cdots & L_d^{(S)} \\ 0 & H_d^{(1)} & 0 & 0 & \cdots & 0 \\ \vdots & \vdots & \ddots & \vdots & \vdots & \ddots & \vdots \\ 0 & 0 & & H_d^{(R)} & 0 & \cdots & 0 \\ 0 & 0 & \cdots & 0 & I & & 0 \\ \vdots & \vdots & \ddots & \vdots & \vdots & \ddots & \vdots \\ 0 & 0 & \cdots & 0 & 0 & & I \end{bmatrix} \begin{bmatrix} \alpha_{d-1} \\ \beta_{d-1}^{(1)} \\ \vdots \\ \beta_{d-1}^{(R)} \\ \gamma_{d-1}^{(1)} \\ \vdots \\ \gamma_{d-1}^{(S)} \end{bmatrix} + \begin{bmatrix} 0 & K_d^{(1)} & \cdots & K_d^{(R)} \\ 0 & I & & 0 \\ \vdots & \vdots & \ddots & \vdots \\ 0 & 0 & & I \\ 0 & 0 & \cdots & 0 \\ \vdots & \vdots & \ddots & \vdots \\ 0 & 0 & \cdots & 0 \end{bmatrix} \begin{bmatrix} v_d \\ w_d^{(1)} \\ \vdots \\ w_d^{(R)} \end{bmatrix}. \quad (27)$$

The hierarchical model is then seen to be a DLM that has an observation equation in which $\bar{F}_d = [F0_{m \times (D+C)}]$, $\bar{u}_d = u_d$, and $\bar{U}_d = U_d$, and a state equation in which $\bar{G}_d$ and $\bar{R}_d$ are the two large matrices in (27) and $\bar{V}_d$ is a block-diagonal matrix with diagonal blocks V, $W^{(1)}, \ldots, W^{(R)}$.

The first approach gives a smaller state vector and a simpler structure for the state transition matrix; the second approach gives a simpler form (often diagonal) for the observation noise covariance matrix, which can be advantageous in computing the likelihood function for the model. In each case the structure of the full model can be built up by adding one term at a time to the state equation. It is therefore straightforward to test model components separately before adding them to the final model.

In the context of the load model, according to an embodiment, the DLM in equations (18)-(19) is always used with $y_d$ as the vector of observed values for the daily load curve and $\bar{F}_d$ and $\bar{G}_d$ as matrices that are either fixed or determined by the observed data for the explanatory variables. Referring back to FIG. 2, blocks 206 and 208, the elements of the covariance matrices $\bar{U}_d$ and $\bar{V}_d$ are usually specified in terms of a smaller set of unknown parameters represented by a vector $\Psi$, which in the said embodiment is not a function of the time-like variable d.

According to an embodiment, two approaches can be used for estimation of the unknown parameters $\Psi$ from the data. The first is based on maximum-likelihood methods, and the second is based on treating the unknown parameters as random variables whose joint distribution is then estimated using Bayesian Markov chain Monte Carlo methods. Although the Bayesian approach is contemplated, the maximum-likelihood approach is used for the estimation of the unknown parameters $\Psi$ in the present context as per block 208, since the evaluation of the likelihood function can be performed using efficient Kalman filter recursions.

Missing values in the load data can be accommodated using standard methods for Kalman filtering. In particular, when some but not all of the observations for a day are missing, that day's observation equation, (13), is replaced by one in which rows of $y_d$, F, and $u_d$ are omitted when they correspond to times of day when load observations are missing. This procedure can also be applied when the aggregation level of the data changes, for example if load data are available at hourly intervals at weekends but at 15-minute intervals on weekdays. It is to be understood that any pattern of load observations within a day can be accommodated in the model without changing the interpretation of the variables and coefficients in the state equations (9)-(12) or (14)-(17).

Referring to block 210 of FIG. 2, once the unknown parameters $\Psi$ are estimated, the corresponding state space model with the estimated $\Psi$ can be updated adaptively using the most recent observational data to generate all required forecasts and forecast standard errors.

State space modeling packages for R, particularly dlm and KFAS, were experimentally used for preliminary evaluation of the model according to embodiments of the present invention, and to obtain some of the experimental results described below.

Figure 3:
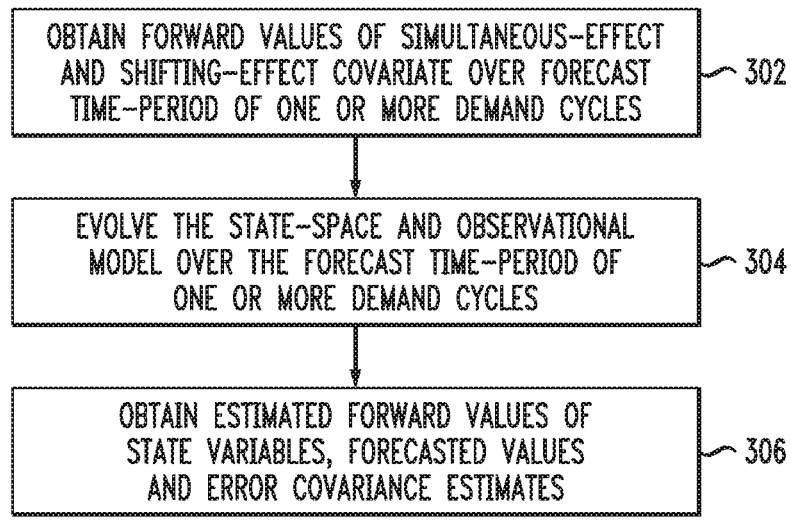
FIG. 3 illustrates steps of a method for creating forecasts based on a model of a cyclical demand system, according to an exemplary embodiment of the present invention.

Referring, for example, to FIG. 3, steps of a method for creating forecasts based on a model of a cyclical demand system, according to an exemplary embodiment of the present invention, include obtaining forward values of simultaneous-effect and shifting-effect covariates over a forecast time-period of one or more demand cycles (302), evolving the state-space and observational model over the forecast time-period of one or more demand cycles (304), and obtaining estimated forward values of state variables, forecasted values and error covariance estimates (306).

Referring to J. Durbin and S. J. Koopman, *Time Series Analysis by State Space Methods*, (2nd ed., Oxford University Press 2012) ("Durbin et al."), in accordance with an embodiment of the present invention, step 304 corresponds to computing the prediction step of the Kalman filter in accordance with the following:

$$a_{t+1} = T_t a_{t|t} \qquad (28)$$
$$= T_t a_t + K_t v_t,$$
$$t = 1, \ldots, n,$$

where $$K_t = T_t P_t Z_t' F_t^{-1}. \qquad (29)$$

The matrix $K_t$ is referred to as the Kalman gain, and $\alpha_{t+1}$ is obtained as linear function of the previous value $\alpha_t$, and forecast error $v_t$ of $y_t$ given $Y_{t-1}$, wherein the prediction step is given by:

$$P_{t+1} = T_t P_t (T_t - K_t Z_t)' + R_t Q_t R'_t, \; t=1, \ldots, n. \qquad (30)$$

Also referring to Durbin et al., in accordance with an embodiment of the present invention, step 306 corresponds to obtaining the minimum mean-square error forecast $\bar{y}_{n+j}$ and its conditional mean square error matrix $\bar{F}_{n+j}$.

Because the computations for block 304 involve "forward values", i.e., values of the covariates at future time points, these are first computed in cases when they are known (e.g., day-of-week effects) and obtained by forecasting in cases when they are not known (e.g., temperature, future price of electricity); these prior computations constitute step 302.

FIG. 5 illustrates basis functions that are used to represent the daily demand cycle (or equivalently the daily load curve), which, as shown is comprised of periodic cubic splines. The number and knot positions of the periodic cubic splines may be varied according to requirements, according to exemplary embodiments of the present invention. Referring, for example, to FIG. 5, graphs 500 and 520 respectively show basis functions with 6 and 9 unequally spaced knots.

Each graph represents the magnitude of the basis functions (y-axis) across different hours of a day (x-axis). The pattern of demand over a time period is expressed in terms of the basis functions so that the eventual load curve is a weighted sum of contributions from demand shapes that follow the basis functions. The basis functions represent a simplification of overall load curve so that the overall load curve can be represented by a finite set of basis coefficients, which are the weight given to each of the basis functions.

Figure 6:
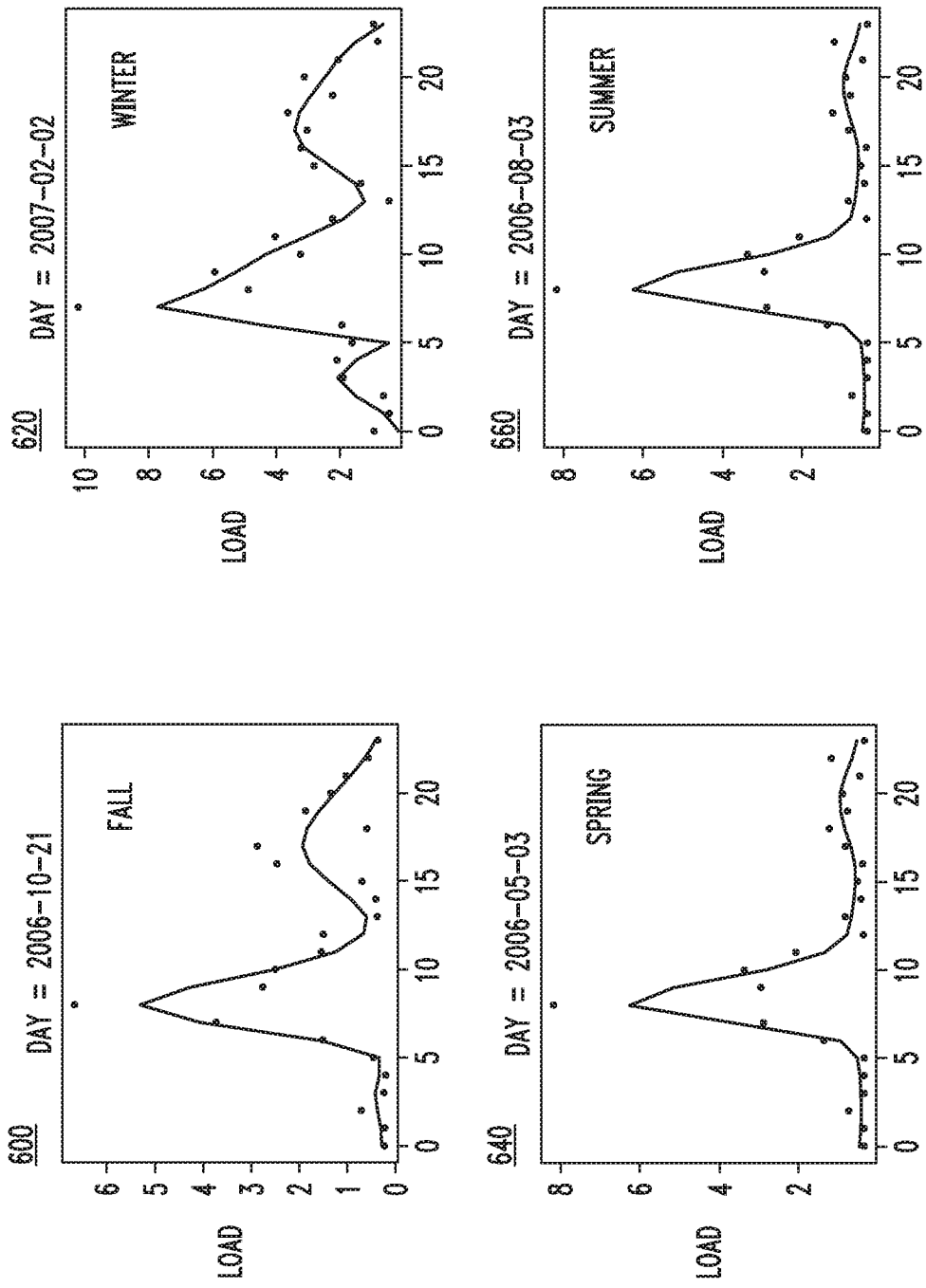
FIG. 6 illustrates the fitting of the daily load curve using the periodic cubic spline basis functions, for the daily load curve at various times in the year, according to an exemplary embodiment of the present invention.

FIG. 6 illustrates the fitting of the daily load curve using the periodic cubic spline basis functions, for the daily load curve at various times in the year, according to an exemplary embodiment of the present invention. FIG. 6 illustrates the results obtained when patterns of usage for four seasons spring 640, summer 660, fall 600, and winter 620 are approximated. The load curve shapes 600-660 show load versus hour of a given day.

Figure 7A:
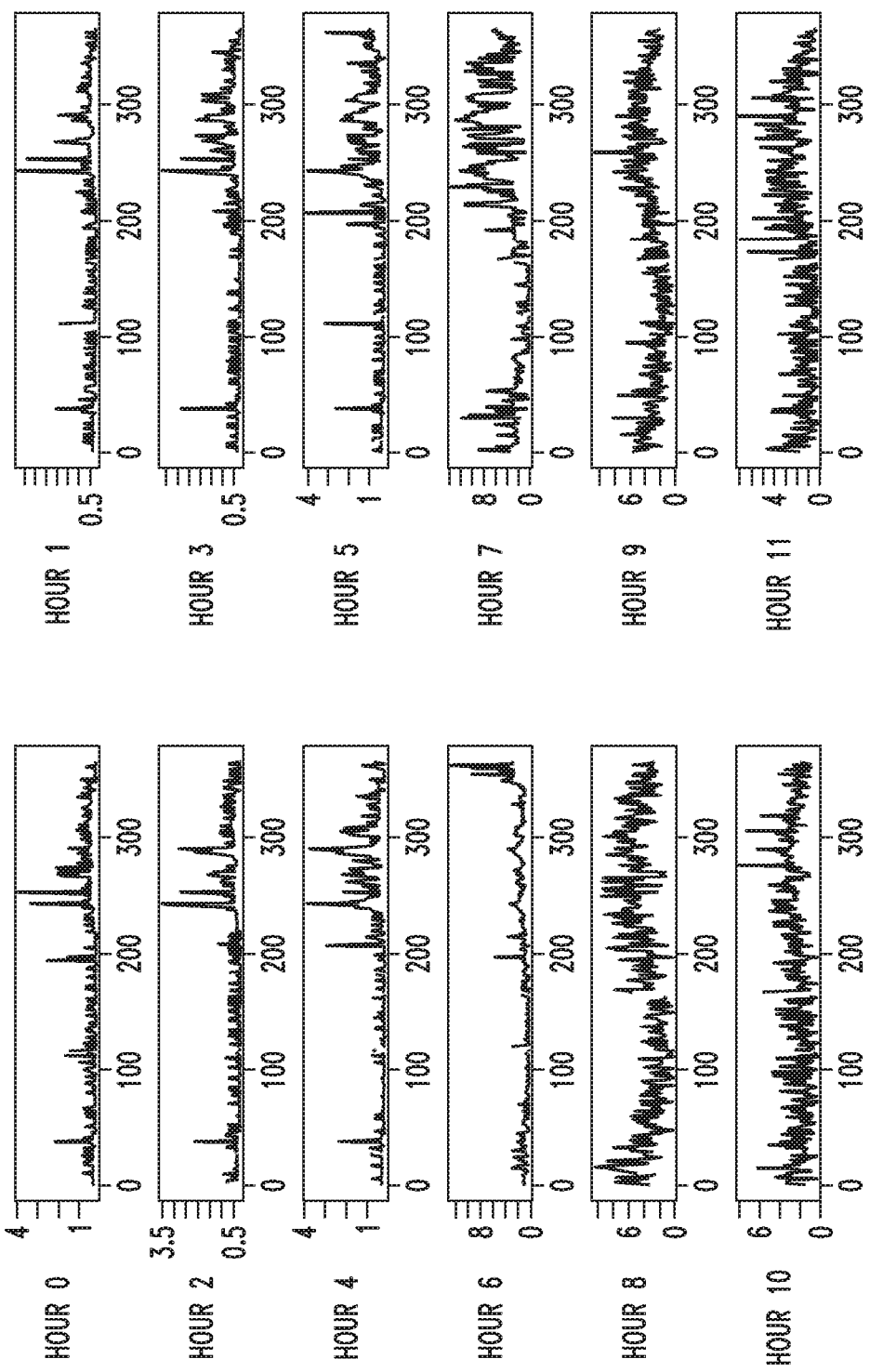

FIGS. 7A-B illustrate time series data of hourly loads which is historical data used in the creation of a model, according to an embodiment of the present invention. Referring, for example, to FIGS. 7A and 7B, which illustrate time series of hourly loads in a daily demand cycle for hours 0-12 (700) and hours 12-23 (720), the horizontal axis represents days 0 to 365 (1 year), and each graph refers to a different hour of the day to show load values (vertical axis) for each day of the year for a particular hour of the day (e.g., hour 0: from 12:00 am to 1:00 am; hour 1: from 1:00 am to 2:00 am, etc.). As an alternative, data may be collected at finer intervals, for example, at 15 minute intervals, in which case, there would be 96 graphs (4 graphs/hour) instead of 24 graphs.

Figure 8:
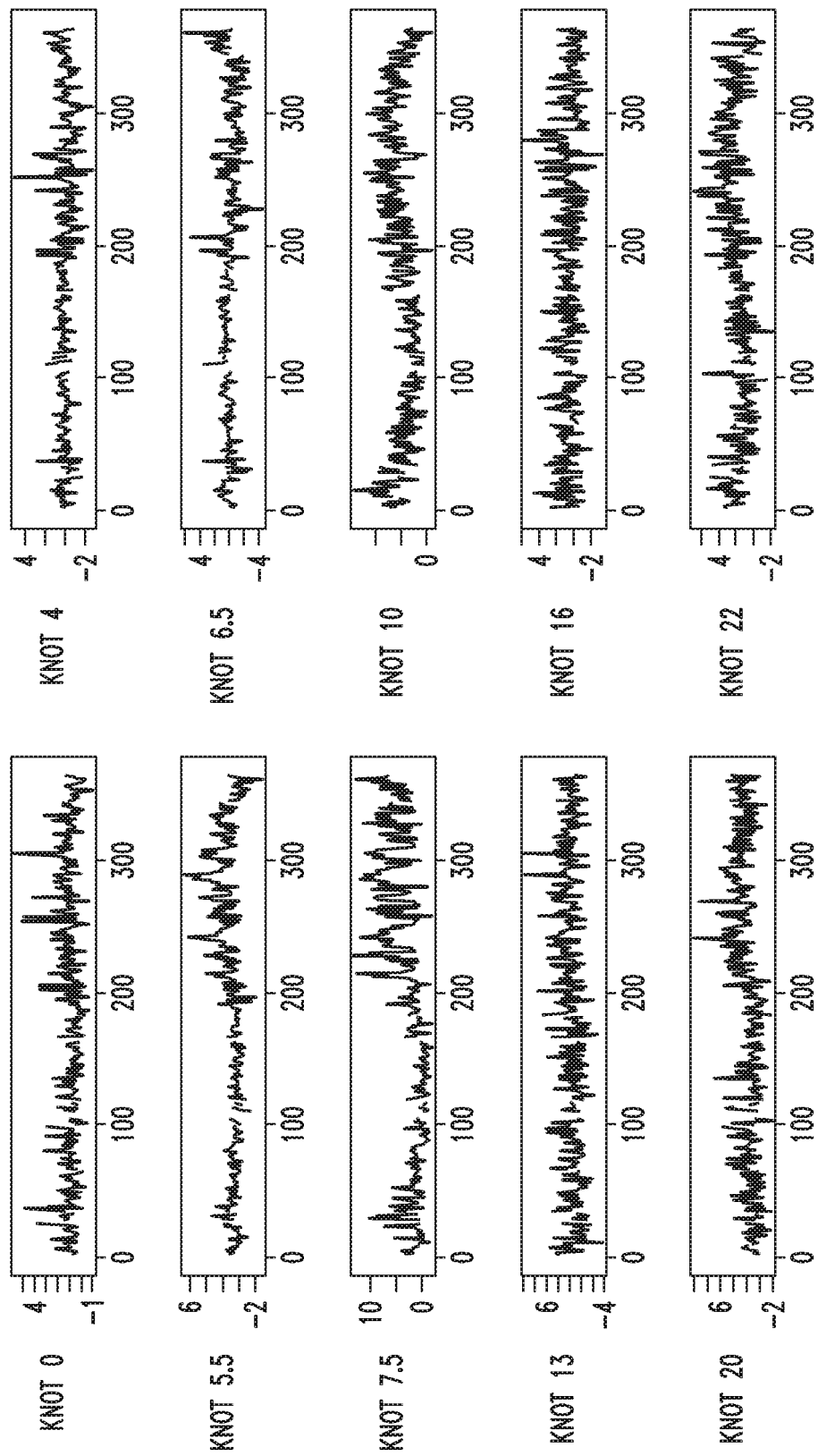
FIG. 8 illustrates time series data expressed in terms of basis coefficients used in the creation of a model, according to an embodiment of the present invention.

Embodiments of the present invention permit processing of the data taken at these finer time intervals and having an increased number of data points. Referring to FIG. 8, which illustrates time series data expressed in terms of basis coefficients used in the creation of a model, according to an embodiment of the present invention. By way of explanation, embodiments of the present invention reduce the number of graphs (e.g., 24 or 96) based on time intervals to corresponding graphs expressed in terms of the basis functions rather than the individual times of day. So, instead of building up a load curve for the day from 24 hourly plots or 96 15-minute plots, the load curve is built up from, for example, 10 basis functions. As a result, the load curve can be reconstructed from a smaller number of graphs (e.g., 10) as opposed to a larger number of graphs (e.g., 24 or 96). Accordingly, the modeling approach in accordance with embodiments of the present invention, generally involves the same amount of computations regardless of level of granularity of the time intervals.

Figure 9:
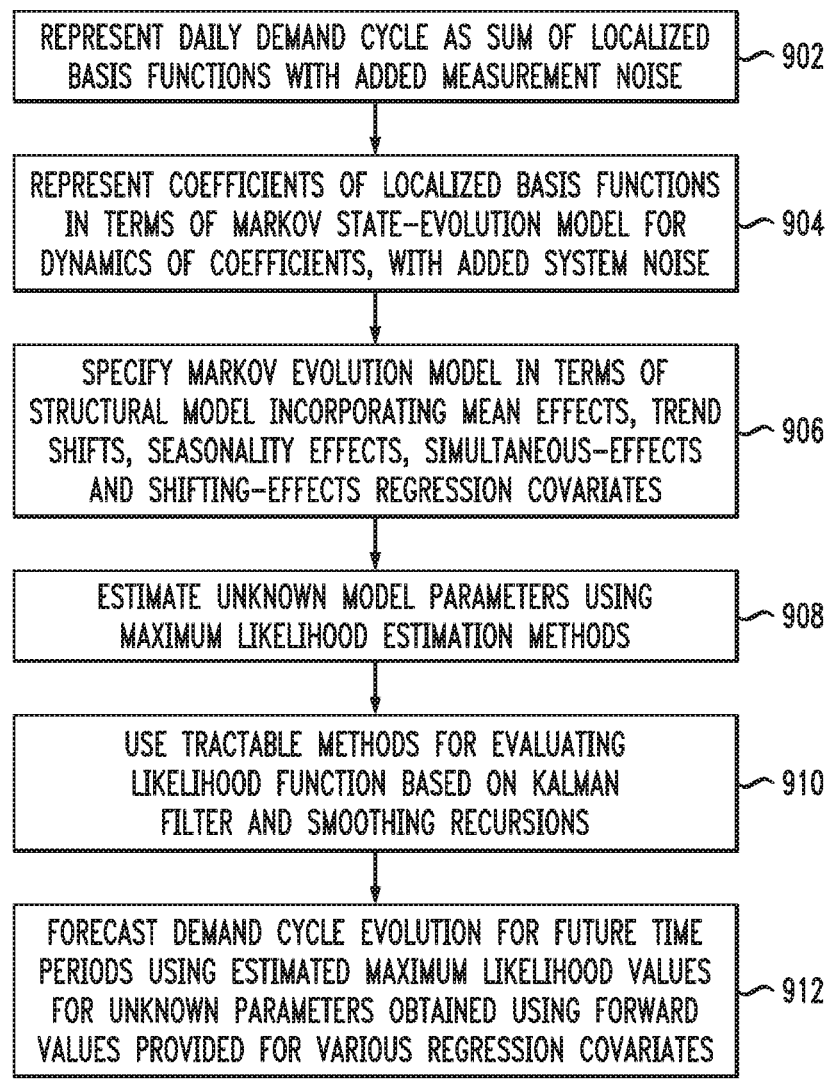
FIG. 9 illustrates a method for the modeling of cyclical demand systems in the presence of dynamic controls or dynamic incentives, in accordance with an embodiment of the present invention.

Based on the foregoing, referring to FIG. 9, in accordance with an embodiment of the present invention, a method 900 for the modeling of cyclical demand systems in the presence of dynamic controls or dynamic incentives, comprises representing a daily demand cycle as a sum of localized basis functions with added measurement noise (902), representing coefficients of the localized basis functions in terms of a Markov state-evolution model for the dynamics of these coefficients, with added system noise (904), specifying in detail, the Markov evolution model in terms of a structural model incorporating mean effects, trend shifts, seasonality effects, simultaneous-effects and shifting-effects regression covariates (906), estimating unknown model parameters using maximum likelihood estimation methods based on historical data (908), using tractable methods for evaluating the likelihood function based on Kalman filter and smoothing recursions (910), and forecasting the demand cycle evolution for future time periods using the estimated maximum likelihood values for the unknown parameters, obtained as described above, using forward values provided for the various regression covariates (912).

Figure 10:
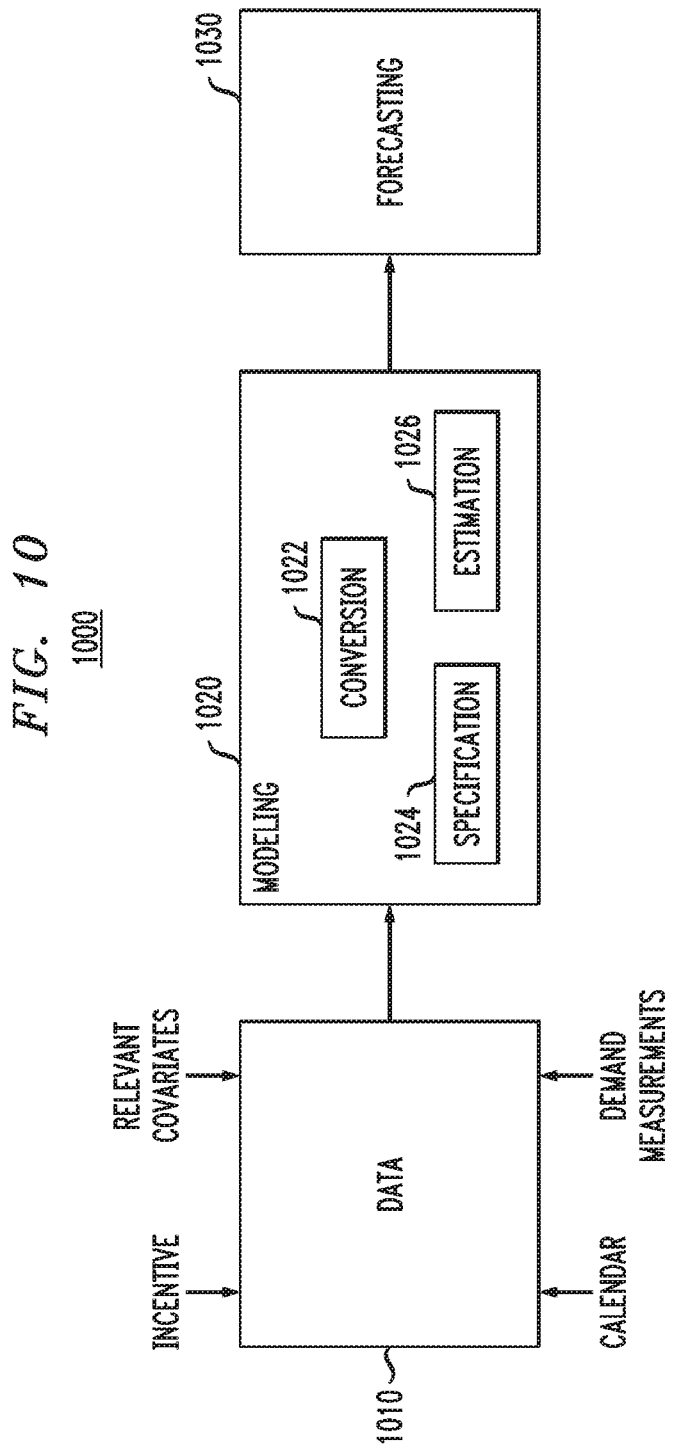
FIG. 10 illustrates a system for the modeling of cyclical demand systems in the presence of dynamic controls or dynamic incentives, in accordance with an embodiment of the present invention.

Referring to FIG. 10, in accordance with an embodiment of the present invention, a system 1000 for the modeling of cyclical demand systems in the presence of dynamic controls or dynamic incentives, comprises a data module 1010, a modeling module 1020 connected with the data module 1010 and forecasting module 1030 connected with the modeling module 1020. In accordance with an embodiment of the present invention, the data module 1010 obtains historical data on one or more demand measurements over a plurality of demand cycles, historical data on incentive signals over the plurality of demand cycles, historical data on at least one covariate over the plurality of demand cycles, wherein the at least one covariate comprises at least one of weather, current events and unemployment, and/or calendar information over the plurality of demand cycles. The modeling module 1020 receives the historical data from the data module 1010, and uses the received historical data to construct a model. The modeling module comprises a specification module 1024 specifying a state-space model and variance parameters in the model, an estimation module 1026 estimating unknown variance parameters, and a conversion module 1022 converting time series data for the one or more demand measurements and the incentive signals expressed in terms of a predetermined time interval to time series data for the one or more demand measurements and the incentive signals expressed in terms of basis coefficients.

In accordance with embodiments of the present invention, the one or more demand measurements include usage of a resource at regular time intervals over a given period by a plurality of consumers, and the incentive signals include at least one of actual pricing and indications that a price will be high or low over a given time period.

In accordance with embodiments of the present invention, the estimation module estimates the unknown variance parameters using a maximum-likelihood method, and the modeling module replaces the unknown variance parameters with the maximum-likelihood estimates.

The forecasting module estimates forecasts and forecast errors using the model. The forecasting module uses predicted values of covariate variables and the maximum-likelihood estimates with a filter to obtain the forecasts and forecast errors.

Embodiments of the present invention allow for analysis of demand based on incentive signals (e.g., actual or expected future prices for future time intervals, e.g., over 5 to 15-minute intervals over the next 24 hours), and allow for using measurement data on the demand at a fine-grained time interval, e.g., 5 to 15-minute intervals and for providing forecasts on the same time interval, which is important for studying the changes in the demand on the same time scale as the changes in the dynamic control.

The basis function approach to the characterization of the demand profile enables the methods in accordance with embodiments of the present invention to provide models and predictions for the effect of price changes both on instantaneous demand as well as on the entire demand profile through the day. The use of explicit model parameters for price elasticity and price substitution elasticity ensure that predicted demand changes in a plausible way when the price-incentive signal is changed.

The basis function coefficients in this characterization of the demand profile evolve according to a state equation with random disturbances, which is equivalent to the representation of the evolution of the demand profile itself. The basis function approach, in accordance with embodiments of the present invention, achieves dimensionality reduction, enables modeling of demand at small time intervals without making excessive computational demands. In addition, the demand measurements or observations are made in discrete time and represent the aggregation over a finite interval; however, the basis functions are expressed as functions in continuous time, and therefore provide a natural smoothing of the observations, and in addition permit forecasts of demand to be made over arbitrarily fine-grained time intervals, e.g., predicting demand over 15-minute or even 5-minute intervals.

Experimental Results

The modeling methodology in accordance with embodiments of the present invention was evaluated using data from the OlyPen project, which as noted above contains usage data for a period of one year from a set of residential customers. The customers were divided into four groups, each consisting of about 30 customers; not all customers stayed with the project for the entire duration, but at least 20 customers in each group were active on any given day. The four customer groups were given different price schedules. Two groups had constant prices and one had prices that varied with time of day according to a fixed schedule, but of particular interest here is the group that received dynamic prices. This group, termed the real-time price (RTP) group, received real-time prices that could vary at 15-minute intervals. These were current prices, and no short-term price forecasts were provided. It is not clear whether the RTP customers received enough information to enable them to shift their load to avoid intervals with high prices, but it is plausible that customers could, albeit imperfectly, extrapolate future prices in the daily demand cycle from the historical data and use this information to shape their demand response.

Figure 11:
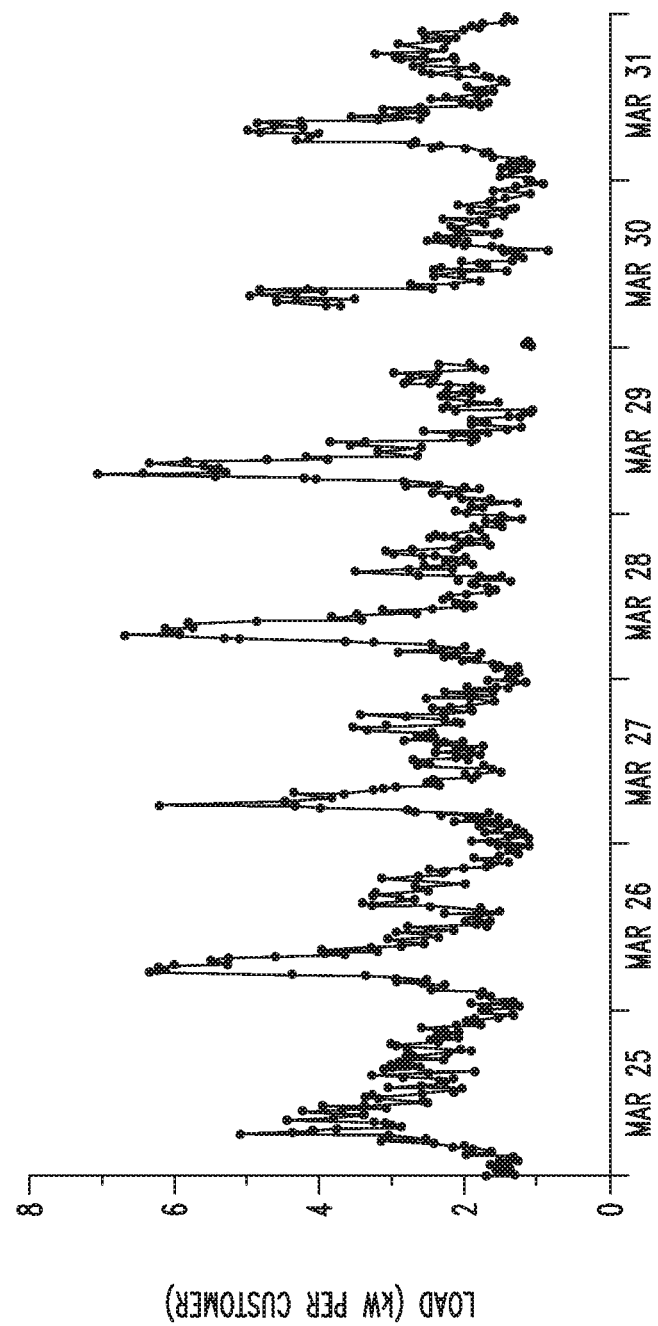
FIG. 11 is a graph illustrating electricity usage by the RTP customer group in 15-minute intervals over a one week period in March 2007.

Price and usage information for the RTP customer group was available at 15-minute intervals for the 11 months beginning 1 May 2006; 716 of the 32160 intervals (about 2.3%) had no data. To avoid irregularities arising from different numbers of customers being active at different times, the average usage per customer was modeled. The corresponding time series for a typical week is shown in FIG. 11. The graph shows the bimodal nature of the daily load curve and the significant weekend effect on this load curve. There are some missing values during the night of March 29-30.

Figure 12:
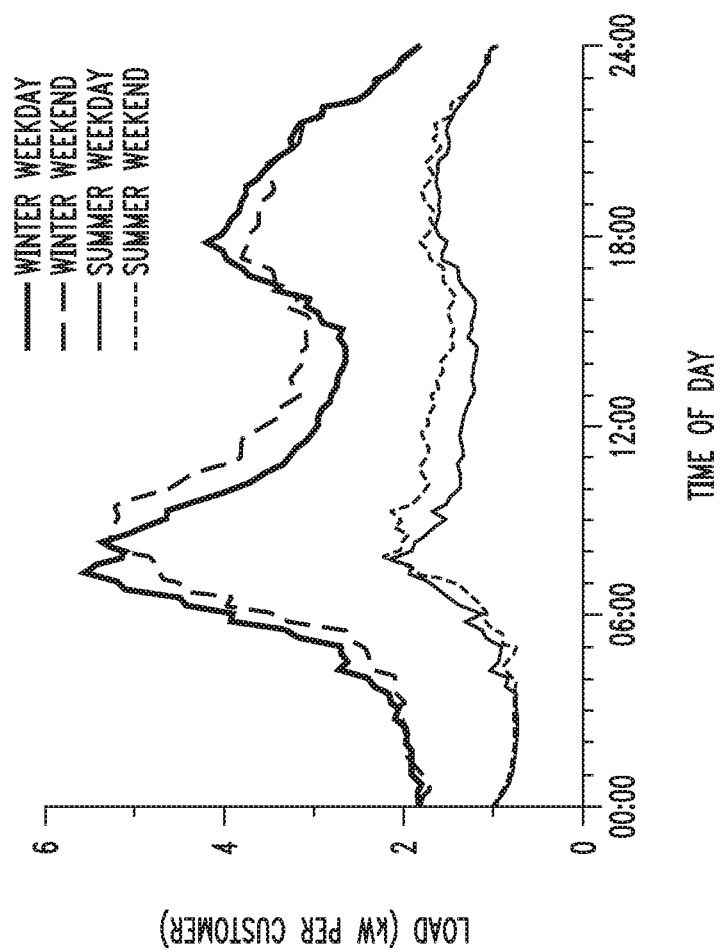
FIG. 12 is a graph illustrating daily load curves for the RTP customer groups in the OlyPen project, averaged over the weekends or weekdays of summer (May 2006 to September 2006) and winter (October 2006 to March 2007).
Figure 13:
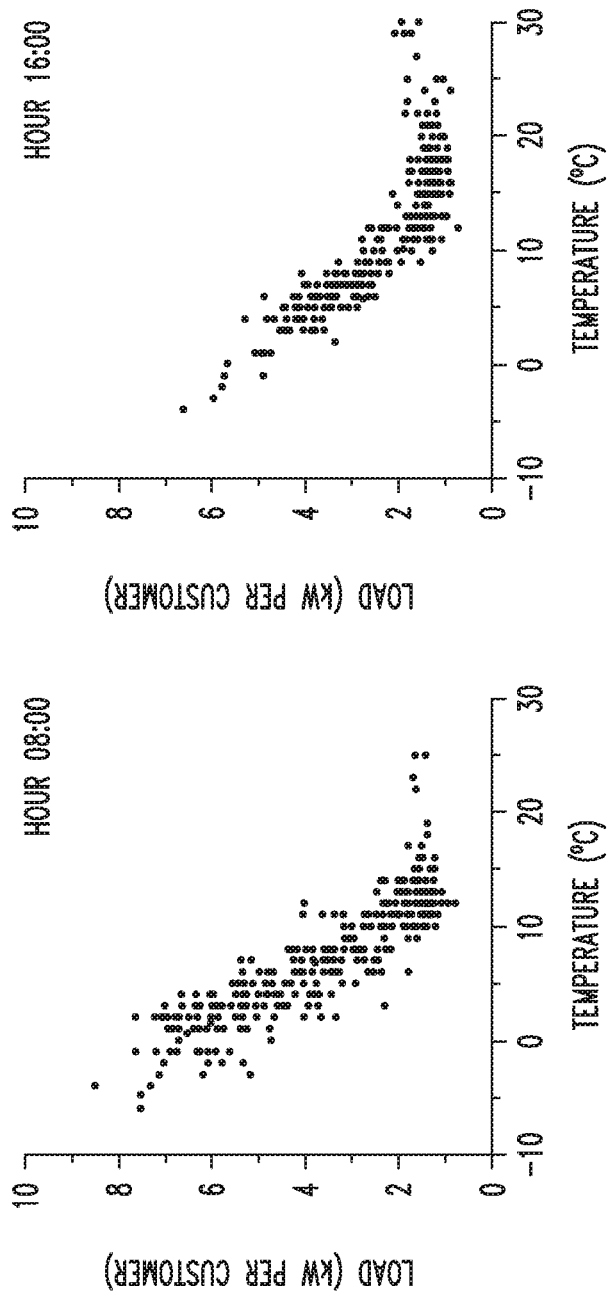
FIG. 13 is a graph illustrating temperature dependence of electricity demand in the RTP customer group during the 8 a.m. and 4 p.m. hours from May 2006 to March 2007.

The daily load curves, averaged over the weekends or weekdays of summer and winter months, are shown in FIG. 12. The OlyPen project also provided hourly temperature information from National Weather Service station KCLM at Port Angeles, Wash. To assist in filling in missing values in the data, temperature data from WeatherBug (Earth Networks, Inc.) for Port Angeles was obtained. 207 missing values in the KCLM temperature series, for blocks of up to 6 hours, were filled in by linear interpolation and for longer periods by linear regression of KCLM temperatures on simultaneous WeatherBug temperatures for a period extending 72 hours either side of the missing values. The temperature dependence of electricity demand for the morning and evening hours using the data for the entire 11-month study period is shown in FIG. 13.

Figure 14:
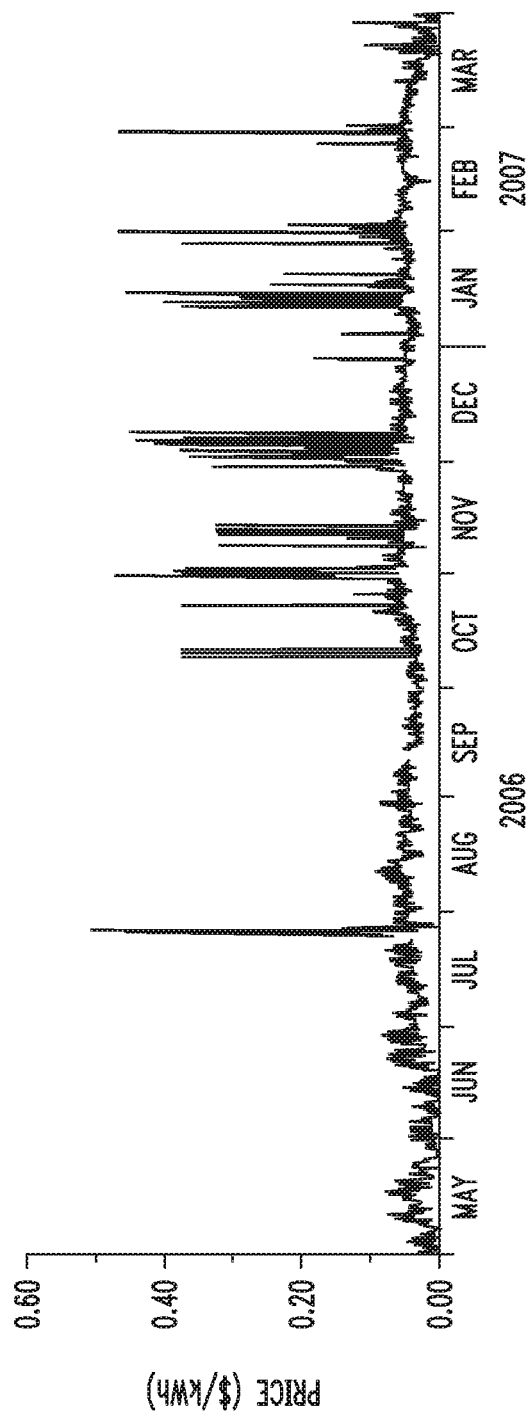
FIG. 14 is a graph illustrating price of electricity as seen by the RTP customer group.

The entire price history experienced by the RTP customer group is shown in FIG. 14. Most of the price variations took place in the winter months, apparently as a consequence of increasing load due to demand for space heating.

The model structure used for the OlyPen data followed the general form set out above. Several aspects of the model structure were chosen appropriately for the data. The load variable, $y_{dm}$ in (1), was taken to be the log-transformed load. Similar accuracy is obtained whether modeling load or log-load, but the logarithmic formulation enables more parsimonious parametrization of the covariance matrices of the model.

Figure 15:
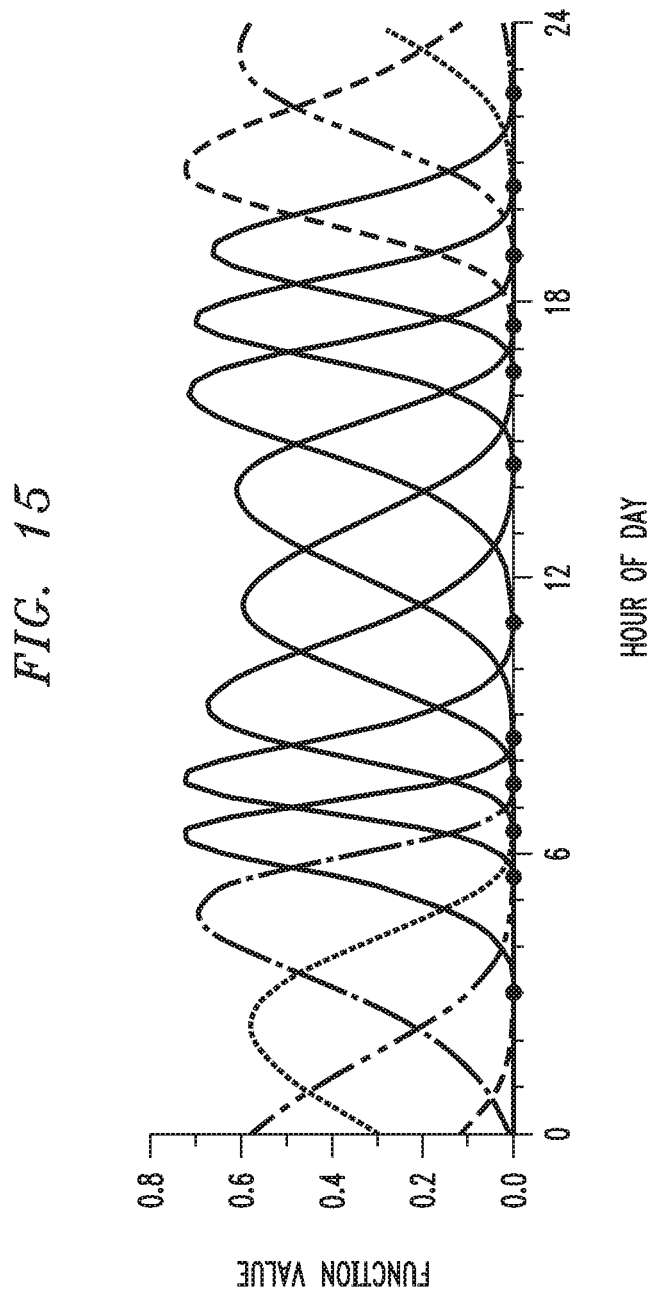
FIG. 15 is a graph illustrating spline basis functions used for the OlyPen data.

The daily load curve was modeled as a combination of 12 cubic B-spline basis functions. The spline functions were periodic with a 24-hour period and knots at 3:00, 5:30, 6:30, 7:30, 8:30, 11:00, 14:30, 16:30, 17:30, 19:00, 20:30, and 22:30. The knot values were chosen subjectively to give a good approximation to the average daily load curve throughout the study period. Knots are relatively closely spaced during the morning and afternoon peak hours, but more widely spaced during the middle of the day and at night. For a given number of knots, this configuration of knots provides an effective approximation by enabling the splines to capture the rapid changes in load at the start and the end of the peak periods. B-splines are localized; each basis function's non-zero values are concentrated on four consecutive inter-knot intervals. Correspondingly, at each time point that is not a knot, four basis functions take nonzero values and only the coefficients of these basis functions will contribute to the load forecast for that time point. The basis functions are shown in FIG. 15. The four basis functions that span midnight are shown with dotted or dashed lines, to facilitate identification of the two segments of each curve. Knot positions are indicated by dots on the horizontal axis.

Day-of-week effects were modeled by the cyclical form (17). No holiday effects were included, since, for this data set, there did not appear to be any distinctive pattern to the load curve for holidays.

Weather dependence was modeled as in (3) by temperature variables $X_{db}^{(l)}$ chosen to have an approximately linear relation with demand. Two variables included in the model were cooling degrees (excess over 18° C.) and heating degrees (deficiency below 15° C.), each with the same coefficient for each basis function (i.e., $\beta_b^{(l)}$ in (3) is the same for all b=1, ..., B).

Price effects were modeled as in (3). A logarithmic transformation was applied to the price. This gives the elasticity coefficients $\varepsilon_{bc}$ a natural interpretation, as noted above, and also increased the log-likelihood of the fitted model. A further improvement in log-likelihood was obtained by setting a floor for the transformed price, using the logarithm of the larger of the actual price and a "floor price" of $0.01/kWh. In accordance with an embodiment, this implies that there is no effect of price on load once the actual price falls below the floor price. In the OlyPen data the RTP price was below $0.01/kWh for 6% of the time; this floor price was lower than the overall median price of $0.0483/kWh.

A single simultaneous elasticity $\varepsilon_s$ and a single cross-elasticity $\varepsilon_x$ were used, each applied to all basis functions. As a result, the matrix of elasticities E=[$\varepsilon_{bc}$] had two distinct elements: each diagonal element was set equal to $\varepsilon_s$ and each off-diagonal element to $\varepsilon_x$. This may be a relatively simple specification of the elasticities, but it appeared that there were not enough large price changes in the data to justify anything more complex, such as different elasticities at different times of day. Apart from the peak hours from 6:00 to 9:00, no hour of the day had more than 20 days when the price exceeded twice the overall median price.

Model estimation used the formulation in (27), the "second approach" discussed above. With this model structure, the state vector has 112 elements: 12 basis function coefficients, 12 local levels, 12×7 day-of-week effects, 2 temperature effects, and 2 price elasticities. When modeling hourly data, the covariance matrices of the model contain 60 variance parameters: 24 diagonal elements in U and 12 each in V, $W^{(\mu)}$, and $W^{(\delta)}$. For 15-minute data U has 96 diagonal elements and there are 132 variance parameters in all. In each case the variance parameters were modeled as 4 distinct values, each of U, V, $W^{(\mu)}$, and $W^{(\delta)}$ being taken to have all diagonal elements equal. This is appropriate when modeling log-transformed load, since the variances describe relative changes in load and are likely to be approximately equal at different times of day. In a model for untransformed load, the variances would vary approximately proportionally to the square of the load at different times of the day and would require a more complex parametrization.

Variance parameters were estimated by maximum likelihood, using a modified Newton-Raphson optimization procedure similar to the BFGS method in R function optim. Computation of the likelihood function, using R with package KFAS on a reasonably fast laptop computer (e.g., including a 2.53 GHz processor) took 2.2 sec for the hourly data (8040 data points) and 2.7 sec for the 15-minute data (32160 data points). Convergence of this iterative procedure was generally rapid, typically within 50-100 iterations, and did not depend on the choice of starting values.

Figure 16:
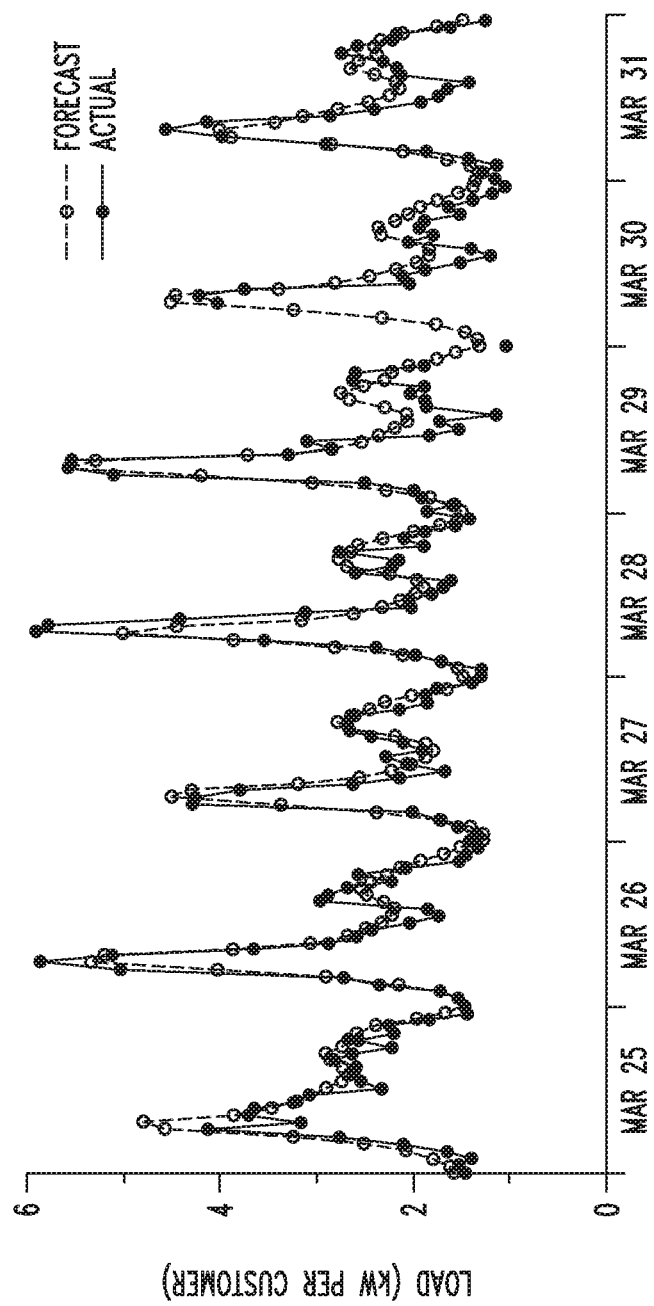
FIG. 16 is a graph illustrating forecast and actual load values for the last week of the study period.

There was a concentration on results from the forecasting model fitted to the hourly log-load data. Sample 1-day-ahead forecasts, transformed back to the original scale, are shown in FIG. 16. In general, the forecasts captured the timing of the peaks in the daily load curve.

Figure 17:
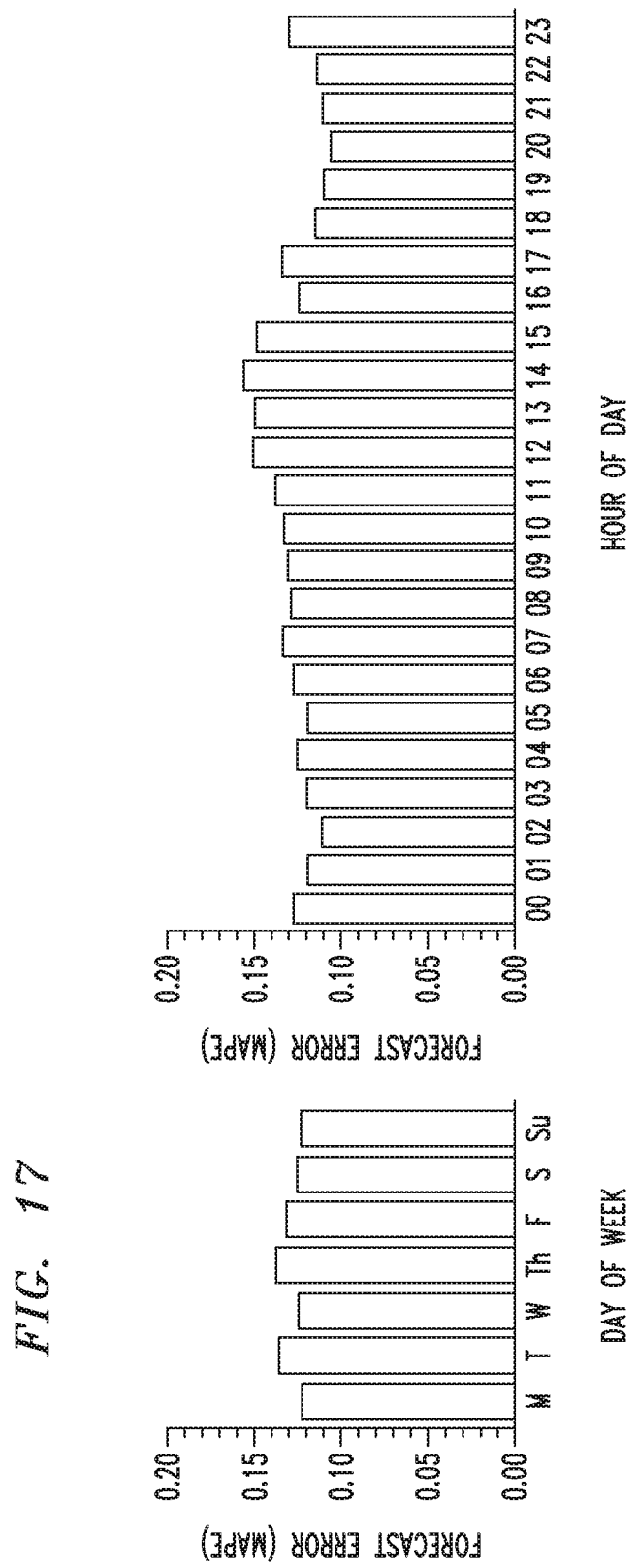
FIG. 17 is a graph illustrating forecast accuracy for the months August 2006 through March 2007, separately for each day of the week and each hour of the day.

The overall forecast accuracy is summarized in FIG. 17. Accuracy is measured by mean absolute percentage error (MAPE), computed for the untransformed load values. The first three months of the study period is treated as a burn-in period for the adaptive state-space model, and forecast accuracy is computed for the remaining months, August 2006 through March 2007. The MAPE value is typically about 13%, and shows little variation with day of week or hour of day. It is noted that the RTP customer group contained only 30 customers, with an average load of about 60 kW, and that the RTP load shows considerable hour-to-hour variation superimposed on the typical daily load curve.

Figure 18:
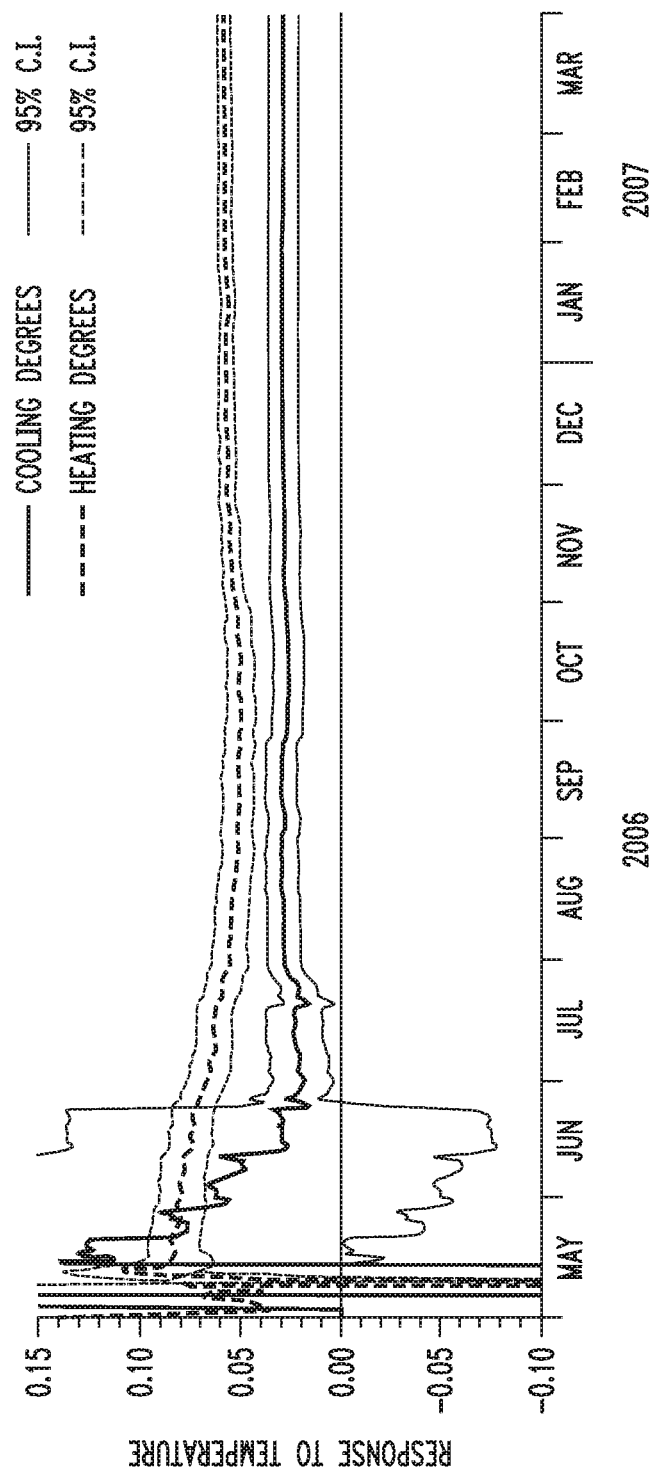
FIG. 18 is a graph illustrating filtered estimates for temperature effects, with 95% confidence intervals.

FIG. 18 shows the estimated temperature effects, which change over time as successive daily observations are incorporated via the Kalman filter. The estimates are initially unstable, but settle down by the end of June when a substantial number of both cooling degrees and heating degrees have been experienced. The coefficient of heating degrees is larger than the coefficient of cooling degrees; this is consistent with the graphs in FIG. 13.

Figure 19:
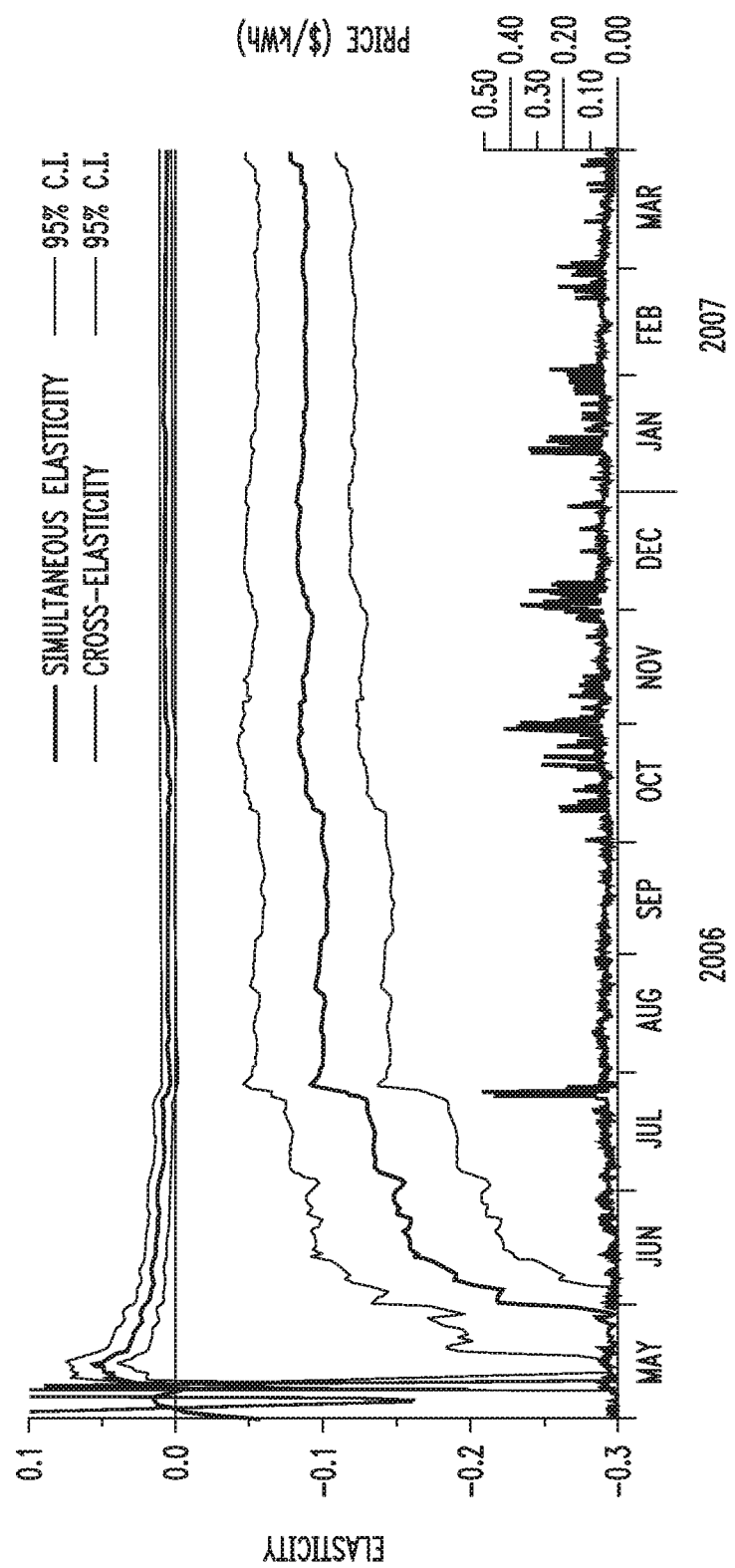
FIG. 19 is a graph illustrating price data and filtered estimates for price elasticities, with 95% confidence intervals.

FIG. 19 shows the estimated price elasticities, and how they change over time. Early in the project the price remains low and the elasticities are probably not meaningful. A burst of high prices in July corresponds to a marked shift in the value of the elasticity parameters. Starting in October, high prices become more frequent, the simultaneous elasticity fluctuates within the range of −0.10 to −0.08, and the cross-elasticity settles to a statistically significant positive value. This is consistent with usage being shifted to periods during the day when the price of electricity was lower and suggests that customers were able to recognize opportunities for reducing their costs by load shifting even though they received information only about current prices and not about prices in any future period.

The final elasticity estimates illustrate the reaction by customers to price changes. The final estimate of simultaneous elasticity is $\varepsilon_s = -0:079$: this implies that doubling the price of electricity leads to a reduction in same-period demand of 5.4%. The final estimate of cross-elasticity is $\varepsilon_x = +0:006$, which suggests that much of the usage shifted out of a period in which price increases are taken up by other periods—the 0.079 reduction in usage in the basis function for the price-increase period is not fully made up by the 0.006 increase in usage of each of the other 11 basis functions.

Even though the experimental modeling used a limited parametrization of price elasticities, the results indicate that RTP customers in the OlyPen project reacted to price increases by shifting part of their usage to other time periods, providing validation for the use of smart grid technology that seeks to influence customer behavior by providing information about current and future electricity prices.

The forecasting model was fitted to both the hourly and 15-minute data. As a consequence of the spline approximation, the state vector $\alpha_d$ in (8) has the same interpretation regardless of the dimension of $y_d$. The state vectors from the two model fits are therefore directly comparable.

Figure 20:
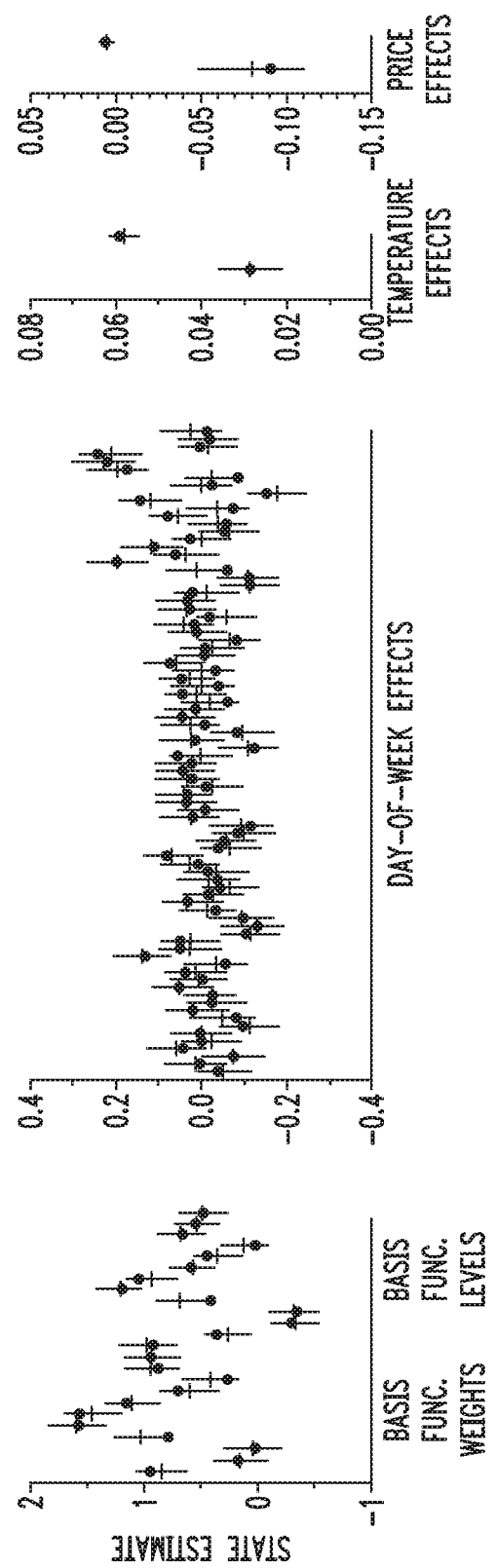
FIG. 20 is a graph illustrating a comparison of estimates of elements of the state vector from hourly data and 15-minute data.

FIG. 20 compares the final estimates of the state vector for the two time granularities. In the figure, each state estimate computed from the 15-minute data is superimposed on the 95% confidence interval for the corresponding state element computed from the hourly data. In general the estimates are very close. For 99 of the 112 elements, the final estimate from 15-minute data is within one standard error of the estimate derived from hourly data. The patterns of relative magnitudes for state elements corresponding to different basis functions are in good agreement, and the temperature effects and price elasticities computed from 15-minute rather than hourly data are very similar. The method for modeling in accordance with embodiments of the present invention is robust to changes in the time granularity of the load observations.

Embodiments of the present invention provide a procedure for short-term forecasting of electricity demand, based on a linear Gaussian state-space model and using the Kalman filter for model estimation and forecasting. Features of the model include, but are not limited to, the approximation of the daily load curve by spline functions, incorporation of dependence on weather, holidays and day-of-week effects, and allowance for load reduction and load-shifting as customers react to price incentive signals.

In particular, approximation of the load curve by a weighted sum of periodic cubic-spline basis functions reduces the size of the state vector needed in the state-space model and ensures the smoothness and consistency of the load curve regardless of the granularity of the time intervals in the observational data. The number of basis functions and the placement of the knots can be chosen after some experimentation to ensure a good fit, particularly in peak periods where demand varies sharply.

The initial model performance using approaches of the embodiments of the present invention on the OlyPen data has been satisfactory, with realistic state estimates and price elasticities being obtained from roughly 90 days of observational data on a set of residential customers subjected to real-time pricing. Results were consistent across different time granularities (15 minutes or 1 hour) of the observational data, which is an important validation of the spline basis function approach.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-20 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 21:
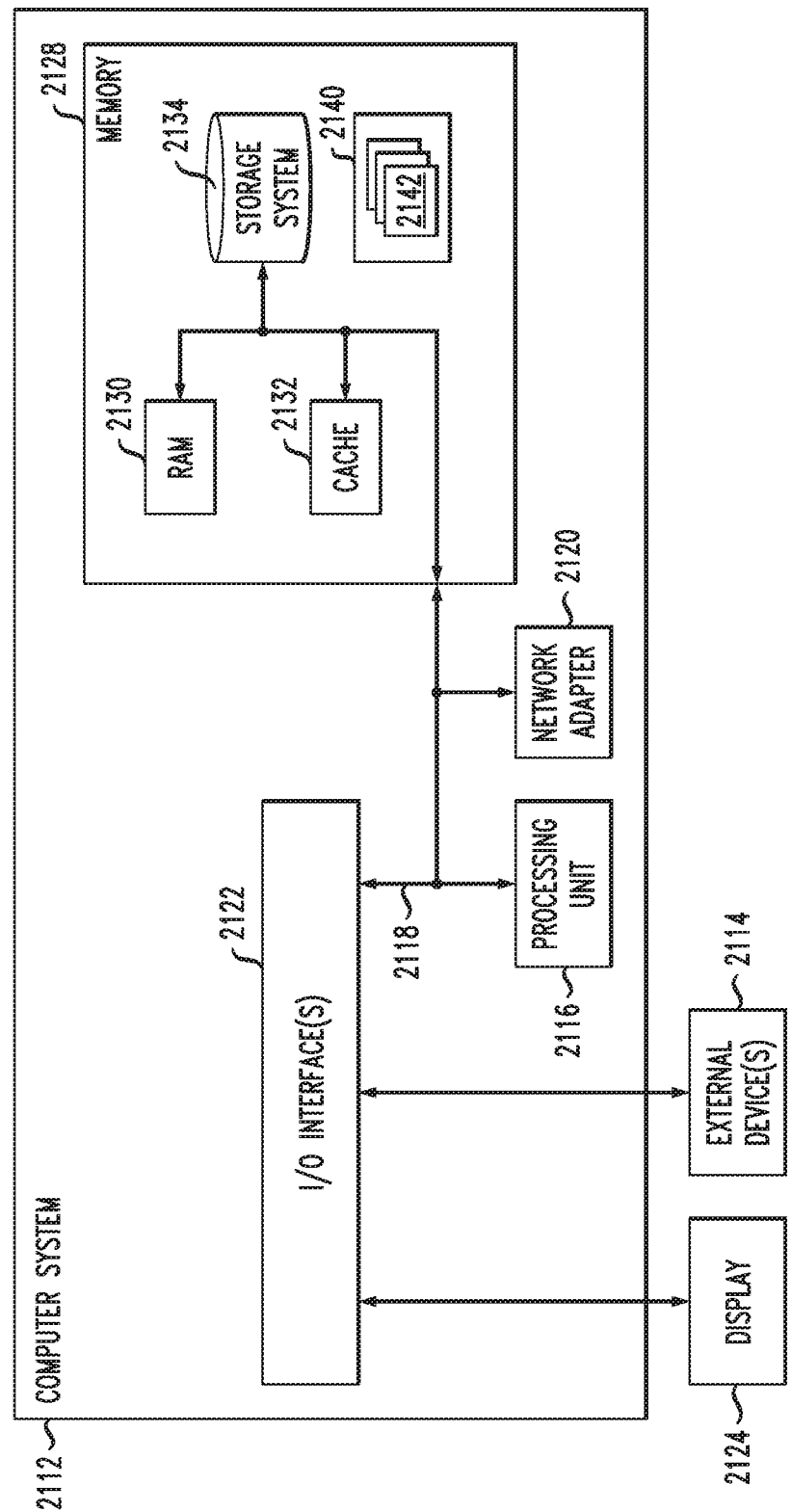
FIG. 21 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 21, in a computing node 2110 there is a computer system/server 2112, which is operational with numerous other general purpose or special purpose computing system environments or configurations. Examples of well-known computing systems, environments, and/or configurations that may be suitable for use with computer system/server 2112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 21, computer system/server 2112 in computing node 2110 is shown in the form of a general-purpose computing device. The components of computer system/server 2112 may include, but are not limited to, one or more processors or processing units 2116, a system memory 2128, and a bus 2118 that couples various system components including system memory 2128 to processor 2116.

The bus 2118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 2112 typically includes a variety of computer system readable media. Such media may be any available media that is accessible by computer system/server 2112, and it includes both volatile and non-volatile media, removable and non-removable media.

The system memory 2128 can include computer system readable media in the form of volatile memory, such as random access memory (RAM) 430 and/or cache memory 2132. The computer system/server 2112 may further include other removable/non-removable, volatile/nonvolatile computer system storage media. By way of example only, storage system 2134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 2118 by one or more data media interfaces. As depicted and described herein, the memory 2128 may include at least one program product having a set (e.g., at least one) of program modules that are configured to carry out the functions of embodiments of the invention. A program/utility 2140, having a set (at least one) of program modules 2142, may be stored in memory 2128 by way of example, and not limitation, as well as an operating system, one or more application programs, other program modules, and program data. Each of the operating system, one or more application programs, other program modules, and program data or some combination thereof, may include an implementation of a networking environment. Program modules 2142 generally carry out the functions and/or methodologies of embodiments of the invention as described herein.

Computer system/server 2112 may also communicate with one or more external devices 2114 such as a keyboard, a pointing device, a display 2124, etc., one or more devices that enable a user to interact with computer system/server 2112, and/or any devices (e.g., network card, modem, etc.) that enable computer system/server 2112 to communicate with one or more other computing devices. Such communication can occur via Input/Output (I/O) interfaces 2122. Still yet, computer system/server 2112 can communicate with one or more networks such as a local area network (LAN), a general wide area network (WAN), and/or a public network (e.g., the Internet) via network adapter 2120. As depicted, network adapter 2120 communicates with the other components of computer system/server 2112 via bus 2118. It should be understood that although not shown, other hardware and/or software components could be used in conjunction with computer system/server 2112. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for modeling a cyclical demand system associated with an electricity grid, comprising:
   a metering component in two-way communication with the electricity grid for collecting usage data; and
   at least one processing device operatively coupled to a memory in communication with the metering component and configured to:
   obtain, over a plurality of demand cycles, fine-grained usage data from the metering component via the two-way communication with the electricity grid over a plurality of fine-grained discrete time intervals, wherein the plurality of fine-grained discrete time intervals have durations that vary based on demand, and wherein the obtained fine-grained usage data comprises first historical data associated with one or more demand measurements over the plurality of demand cycles, second historical data associated with incentive signals over the plurality of demand cycles, and time series data for the first and second historical data;
   dynamically transmit the incentive signals to a plurality of customers on the electricity grid, wherein the incentive signals comprise actual electricity pricing data and an indication that a price of electricity will be higher or lower over a given time period;
   construct a dynamic linear model using the obtained fine-grained usage data, wherein the dynamic linear model is constructed as a weighted sum of a plurality of basis functions by converting the time series data into coefficients of the plurality of basis functions
   wherein the constructing of the dynamic linear model as the weighted sum of the plurality of basis functions reduces dimensionality in connection with performance of computations by the at least one processing device to construct the dynamic linear model based on the plurality of fine-grained discrete time intervals;
   wherein a number of the plurality of basis functions is less than a number of the plurality of fine-grained discrete time intervals;
   wherein a model for the coefficients of the plurality of basis functions is dependent on the incentive signals, the incentive signals indicating dynamic pricing of the electricity over the given time period to enable the model for coefficients to capture demand shifting effects in response to the dynamic pricing;

wherein the model for the coefficients of the plurality of basis functions comprises a holiday effect;

wherein a holiday indicator is one of a binary variable and a fractional value; and wherein in converting the time series data, the at least one processing device is configured to convert a first plurality of graphs based on the plurality of fine-grained discrete time intervals to a second plurality of graphs corresponding to the first plurality of graphs, wherein the second plurality of graphs are based on the plurality of basis functions and the number of the second plurality of graphs is less than the number of the first plurality of graphs; and estimate a forecasted demand cycle over the plurality of fine-grained discrete time intervals by obtaining forecasts and forecast errors using the dynamic linear model;

wherein, in constructing the dynamic linear model, the at least one processing device is further configured to:

specify a state-space model and variance parameters in the state-space model;

estimate one or more unknown variance parameters by using a maximum-likelihood method to generate one or more maximum-likelihood estimates;

replace the one or more unknown variance parameters with the one or more maximum-likelihood estimates; and generate a load curve from the second plurality of graphs based on the weighted sums of the plurality of basis functions;

wherein the forecasts and forecast errors are obtained based at least in part on the maximum-likelihood estimates.

2. The system according to claim 1, wherein the first historical data comprises data associated with usage of a resource at regular time intervals over a given period by a plurality of consumers.

3. The system according to claim 1, wherein the obtained fine-grained usage data further comprises calendar information over the plurality of demand cycles.

4. The system according to claim 1, wherein the state-space model includes at least one of overall level, day-of-week effects, simultaneous-effects and shifting-effects.

5. The system according to claim 1, wherein, in constructing the dynamic linear model, the at least one processing device is further configured to specify prior distributions for initial values of a state vector.

6. The system according to claim 1, wherein the plurality of basis functions comprise a plurality of knots at locations corresponding to peak periods of electricity usage.

7. The system according to claim 6, wherein the plurality of basis functions comprise periodic cubic-spline basis functions.

8. A method for modeling a cyclical demand system associated with an electricity grid, comprising:

maintaining a metering component in two-way communication with the electricity grid for collecting usage data;

obtaining, over a plurality of demand cycles, fine-grained usage data from the metering component via the two-way communication with the electricity grid over a plurality of fine-grained discrete time intervals, wherein the plurality of fine-grained discrete time intervals have durations that vary based on demand, and wherein the obtained fine-grained usage data comprises first historical data associated with one or more demand measurements over the plurality of demand cycles, second historical data associated with incentive signals over the plurality of demand cycles, and time series data for the first and second historical data;

dynamically transmitting the incentive signals to a plurality of customers on the electricity grid, wherein the incentive signals comprise actual electricity pricing data and an indication that a price of electricity will be higher or lower over a given time period;

constructing a dynamic linear model using the obtained fine-grained usage data, wherein the dynamic linear model is constructed as a weighted sum of a plurality of basis functions by converting the time series data into coefficients of the plurality of basis functions;

wherein the constructing of the dynamic linear model as the weighted sum of the plurality of basis functions reduces dimensionality in connection with performance of computations to construct the dynamic linear model based on the plurality of fine-grained discrete time intervals;

wherein a number of the plurality of basis functions is less than a number of the plurality of fine-grained discrete time intervals;

wherein a model for the coefficients of the plurality of basis functions is dependent on the incentive signals, the incentive signals indicating dynamic pricing of the electricity over the given time period to enable the model for coefficients to capture demand shifting effects in response to the dynamic pricing;

wherein the model for the coefficients of the plurality of basis functions comprises a holiday effect wherein a holiday indicator is one of a binary variable and a fractional value; and wherein converting the time series data comprises converting a first plurality of graphs based on the plurality of fine-grained discrete time intervals to a second plurality of graphs corresponding to the first plurality of graphs, wherein the second plurality of graphs are based on the plurality of basis functions and the number of the second plurality of graphs is less than the number of the first plurality of graphs; and estimating a forecasted demand cycle over the plurality of fine-grained discrete time intervals by obtaining forecasts and forecast errors using the dynamic linear model;

wherein constructing the dynamic linear model comprises:

specifying a state-space model and variance parameters in the state-space model;

estimating one or more unknown variance parameters by using a maximum-likelihood method to generate one or more maximum-likelihood estimates;

replacing the one or more unknown variance parameters with the one or more maximum-likelihood estimates; and generating a load curve from the second plurality of graphs based on the weighted sums of the plurality of basis functions;

wherein the forecasts and forecast errors are obtained based at least in part on the maximum-likelihood estimates; and wherein the steps of the method are performed by at least one processing device operatively coupled to a memory.

9. The method according to claim 8, wherein the first historical data comprises data associated with usage of a resource at regular time intervals over a given period by a plurality of consumers.

10. The method according to claim 8, wherein the obtained fine-grained usage data further comprises calendar information over the plurality of demand cycles.

11. The method according to claim 8, wherein the state-space model includes at least one of overall level, day-of-week effects, simultaneous-effects and shifting-effects.

12. The method according to claim 8, wherein constructing the dynamic linear model further comprises specifying prior distributions for initial values of a state vector.

13. The method according to claim 8, wherein the plurality of basis functions comprise a plurality of knots at locations corresponding to peak periods of electricity usage.

14. The method according to claim 13, wherein the plurality of basis functions comprise periodic cubic-spline basis functions.

15. An article of manufacture comprising a non-transitory processor readable storage medium comprising program code tangibly embodied thereon, which when executed by a processor, performs steps for modeling a cyclical demand system associated with an electricity grid, the steps comprising:

maintaining a metering component in two-way communication with the electricity grid for collecting usage data;

obtaining, over a plurality of demand cycles, fine-grained usage data from the metering component via the two-way communication with the electricity grid over a plurality of fine-grained discrete time intervals, wherein the plurality of fine-grained discrete time intervals have durations that vary based on demand, and wherein the obtained fine-grained usage data comprises first historical data associated with one or more demand measurements over the plurality of demand cycles, second historical data associated with incentive signals over the plurality of demand cycles, and time series data for the first and second historical data;

dynamically transmitting the incentive signals to a plurality of customers on the electricity grid, wherein the incentive signals comprise actual electricity pricing data and an indication that a price of electricity will be higher or lower over a given time period;

constructing a dynamic linear model using the obtained fine-grained usage data, wherein the dynamic linear model is constructed as a weighted sum of a plurality of basis functions by converting the time series data into coefficients of the plurality of basis functions;

wherein the constructing of the dynamic linear model as the weighted sum of the plurality of basis functions reduces dimensionality in connection with performance of computations by the processor to construct the dynamic linear model based on the plurality of fine-grained discrete time intervals;

wherein a number of the plurality of basis functions is less than a number of the plurality of fine-grained discrete time intervals;

wherein a model for the coefficients of the plurality of basis functions is dependent on the incentive signals, the incentive signals indicating dynamic pricing of the electricity over the given time period to enable the model for coefficients to capture demand shifting effects in response to the dynamic pricing;

wherein the model for the coefficients of the plurality of basis functions comprises a holiday effect wherein a holiday indicator is one of a binary variable and a fractional value; and wherein converting the time series data comprises converting a first plurality of graphs based on the plurality of fine-grained discrete time intervals to a second plurality of graphs corresponding to the first plurality of graphs, wherein the second plurality of graphs are based on the plurality of basis functions and the number of the second plurality of graphs is less than the number of the first plurality of graphs; and estimating a forecasted demand cycle over the plurality of fine-grained discrete time intervals by obtaining forecasts and forecast errors using the dynamic linear model;

wherein constructing the dynamic linear model comprises:

specifying a state-space model and variance parameters in the state-space model;

estimating one or more unknown variance parameters by using a maximum-likelihood method to generate one or more maximum-likelihood estimates;

replacing the one or more unknown variance parameters with the one or more maximum-likelihood estimates; and generating a load curve from the second plurality of graphs based on the weighted sums of the plurality of basis functions;

wherein the forecasts and forecast errors are obtained based at least in part on the maximum-likelihood estimates.

16. The article according to claim 15, wherein the first historical data comprises data associated with usage of a resource at regular time intervals over a given period by a plurality of consumers.

17. The article according to claim 15, wherein the obtained fine-grained usage data further comprises calendar information over the plurality of demand cycles.

18. The article according to claim 15, wherein the state-space model includes at least one of overall level, day-of-week effects, simultaneous-effects and shifting-effects.

19. The article according to claim 15, wherein constructing the dynamic linear model further comprises specifying prior distributions for initial values of a state vector.

20. The article according to claim 15, wherein the plurality of basis functions comprise a plurality of knots at locations corresponding to peak periods of electricity usage.

* * * * *